US009297302B2

(12) United States Patent
Towne

(10) Patent No.: US 9,297,302 B2
(45) Date of Patent: Mar. 29, 2016

(54) MECHANICAL-BASED ANTI-COGGING APPARATUSES AND SYSTEMS FOR APPLYING AN ANTI-COGGING TORQUE ON A ROTATING SHAFT

(71) Applicant: Raymond Towne, Westland, MI (US)

(72) Inventor: Raymond Towne, Westland, MI (US)

(*) Notice: Subject to any disclaimer, the term of this patent is extended or adjusted under 35 U.S.C. 154(b) by 134 days.

(21) Appl. No.: 14/184,072

(22) Filed: Feb. 19, 2014

(65) Prior Publication Data

US 2014/0165775 A1   Jun. 19, 2014

Related U.S. Application Data

(63) Continuation of application No. 14/183,673, filed on Feb. 19, 2014, which is a continuation-in-part of application No. 13/234,858, filed on Sep. 16, 2011, now Pat. No. 8,701,615.

(60) Provisional application No. 61/403,547, filed on Sep. 18, 2010.

(51) Int. Cl.
*F02B 75/06* (2006.01)
*F16F 15/30* (2006.01)
(Continued)

(52) U.S. Cl.
CPC .............. *F02B 75/06* (2013.01); *F16F 15/005* (2013.01); *Y10T 74/2101* (2015.01)

(58) Field of Classification Search
CPC ........ F02B 75/06; F02B 75/20; B60W 10/06; F16F 15/264; F16F 15/265; H02K 21/24; H02K 1/2793
USPC ...................... 123/192.1, 192.2; 318/400.23; 310/156.35
See application file for complete search history.

(56) References Cited

U.S. PATENT DOCUMENTS 1,312,585 A * 8/1919 Shepherd .................... 123/197.1
1,899,431 A * 2/1933 Woolson ....................... 123/445
(Continued)

FOREIGN PATENT DOCUMENTS

DE   102010044716 A1   4/2011
EP       0175952 A2   4/1986
(Continued)

OTHER PUBLICATIONS

International Search Report for International Application No. PCT/US2012/055015 mailed Feb. 28, 2013.
(Continued)

*Primary Examiner* — Lindsay Low
*Assistant Examiner* — Syed O Hasan
(74) *Attorney, Agent, or Firm* — Harness, Dickey & Pierce, P.L.C.

(57) ABSTRACT

An apparatus that improves rotation of a shaft. The shaft has a cyclical cogging torque acting thereon in a first direction. A support member is adjacent the shaft. The shaft is operable to rotate relative to the support member. A first anti-cogging member is coupled to the support member. A second anti-cogging member is coupled to the shaft to rotate based on rotation of the shaft. A cam surface has a lobe that is included on one of the first and second anti-cogging members. An abutment member is coupled to the other of the first and second anti-cogging members. The abutment member is operable to abut against the cam surface to provide an anti-cogging torque to the shaft in a second direction that opposes the first direction to at least partially offset the cogging torque. The biasing member biases the abutment member toward the cam surface.

25 Claims, 28 Drawing Sheets

(51) Int. Cl.
   *H02K 29/06* (2006.01)
   *F16F 15/00* (2006.01)

(56) References Cited

U.S. PATENT DOCUMENTS

| | | | |
|---|---|---|---|
| 3,293,939 | A | 12/1966 | Brown |
| 3,998,200 | A * | 12/1976 | Sudholt ............... 123/197.1 |
| 4,151,431 | A | 4/1979 | Johnson |
| 4,779,454 | A | 10/1988 | Fitzner et al. |
| 4,858,044 | A | 8/1989 | Crapo |
| 5,455,474 | A | 10/1995 | Flynn |
| 5,572,962 | A | 11/1996 | Riley |
| 6,054,788 | A | 4/2000 | Dombrovski et al. |
| 6,184,605 | B1 | 2/2001 | Kim |
| 6,246,561 | B1 | 6/2001 | Flynn |
| 6,946,938 | B1 | 9/2005 | Pedersen |
| 7,248,006 | B2 | 7/2007 | Bailey et al. |
| 7,265,471 | B2 | 9/2007 | Sprain |
| 7,327,061 | B2 | 2/2008 | Rogala |
| 7,342,623 | B2 | 3/2008 | Ishizaki |
| 7,479,722 | B2 | 1/2009 | Takeuchi et al. |
| 7,737,596 | B2 | 6/2010 | Boucher et al. |
| 8,232,690 | B2 | 7/2012 | Overstreet |
| 8,701,615 | B2 | 4/2014 | Towne, III |
| 2003/0071530 | A1 | 4/2003 | Takahashi |
| 2003/0080641 | A1 | 5/2003 | Ando et al. |
| 2004/0212273 | A1 | 10/2004 | Gould |
| 2005/0029888 | A1 | 2/2005 | Inayama et al. |
| 2005/0275359 | A1 | 12/2005 | Takeuchi et al. |
| 2006/0037595 | A1 * | 2/2006 | Procknow ............... 123/572 |
| 2007/0017464 | A1 | 1/2007 | Pflug et al. |
| 2008/0174189 | A1 | 7/2008 | Boucher et al. |
| 2012/0067317 | A1 | 3/2012 | Towne |
| 2012/0074913 | A1 | 3/2012 | Finkle |
| 2013/0270951 | A1 | 10/2013 | Semmer et al. |
| 2014/0165952 | A1 | 6/2014 | Towne |

FOREIGN PATENT DOCUMENTS

| | | |
|---|---|---|
| JP | S555453 A | 1/1980 |
| JP | S62242152 A | 10/1987 |
| JP | 2011089477 A | 5/2011 |
| WO | WO 2008-089536 | 7/2008 |

OTHER PUBLICATIONS

Written Opinion of the International Searching Authority for International Application No. PCT/US2012/055015 mailed Feb. 28, 2013.

International Search Report and Written Opinion for PCT Application No. PCT/US2015/016681 mailed Jul. 10, 2015; 19 pages.

Search Report from European Application No. 12830936.6 dated Mar. 20, 2015; 5 pages.

* cited by examiner

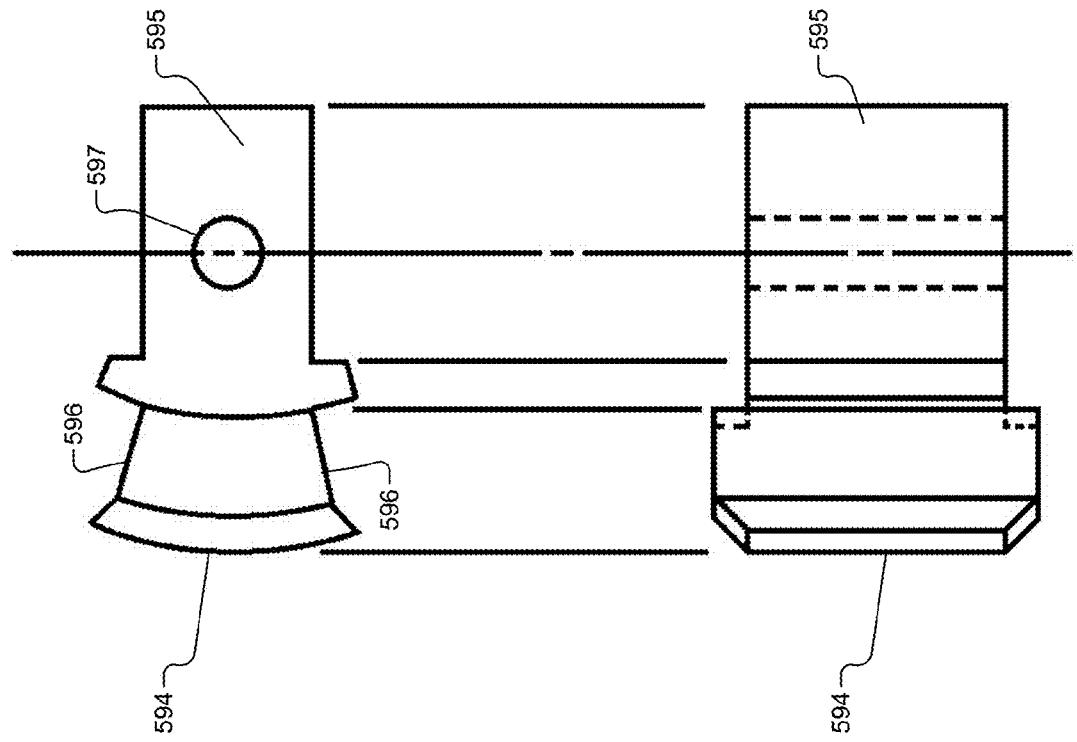
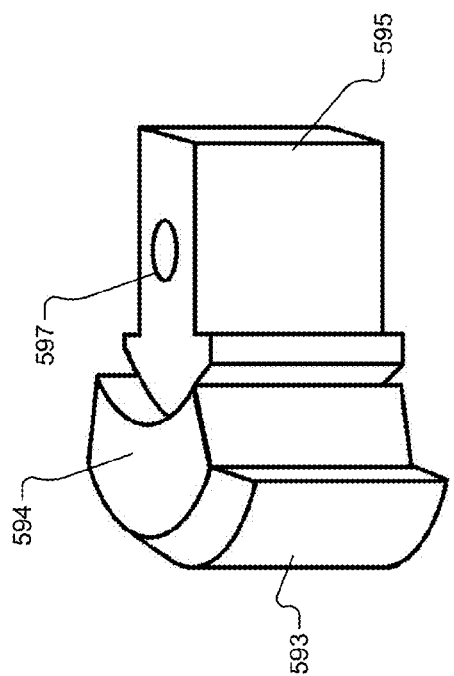
FIG. 19B
FIG. 19A

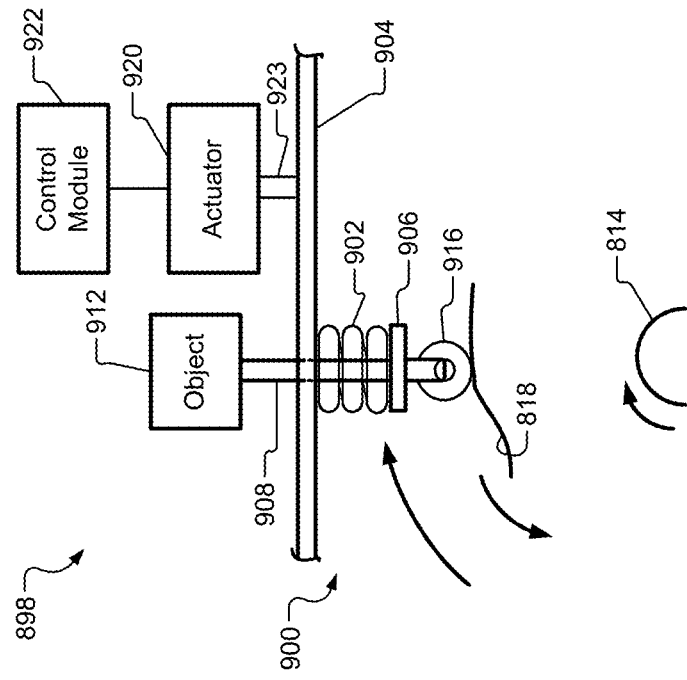
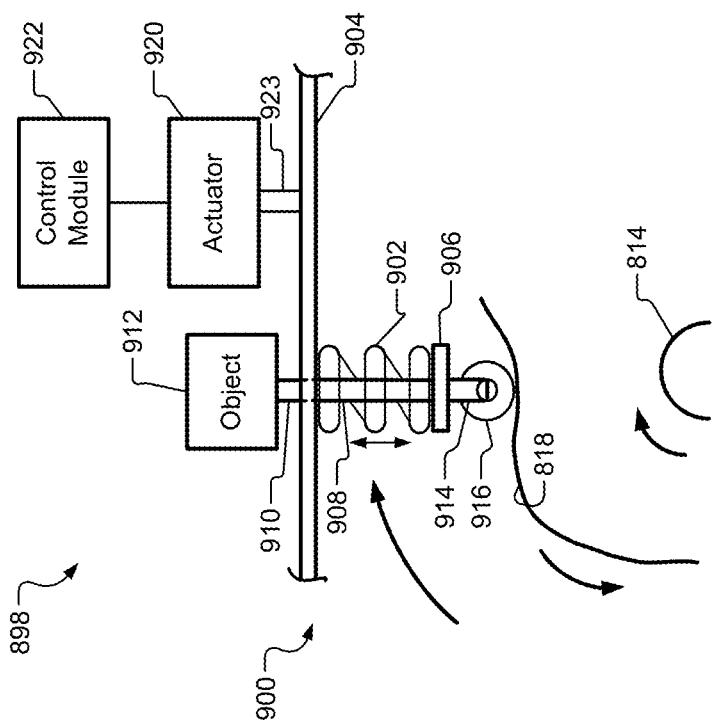

MECHANICAL-BASED ANTI-COGGING APPARATUSES AND SYSTEMS FOR APPLYING AN ANTI-COGGING TORQUE ON A ROTATING SHAFT

CROSS-REFERENCE TO RELATED APPLICATIONS

The present disclosure is a continuation application of U.S. patent application Ser. No. 14/183,673 filed on Feb. 19, 2014, which is a continuation-in-part application of U.S. patent application Ser. No. 13/234,858 filed on Sep. 16, 2011. This application claims the benefit of U.S. Provisional Application No. 61/403,547, filed on Sep. 18, 2010. The entire disclosure of the above application is incorporated herein by reference.

FIELD

The present disclosure relates to an anti-cogging apparatus and, more particularly, to an anti-cogging apparatuses and systems for counteracting and minimizing cogging of a rotating shaft.

BACKGROUND

This section provides background information related to the present disclosure which is not necessarily prior art.

Many machines (e.g., electric motors) include a rotating shaft to which torque is applied. In an electric motor, for instance, active elements produce interacting magnetic fields that turn a rotor and, thus, a shaft of the motor.

Such machines can also experience cogging. For instance, in an electric motor, passive (non-motive power) interaction between magnetic elements of a stator and a rotor can cause cogging that sequentially and cyclically applies positive torque (aiding rotation of the shaft) and negative torque (hindering rotation of the shaft). The cogging torque can cause undesirable vibrations of the motor and can be especially noticeable at low rotational speeds.

Other machines, such as a cam system, experience cogging loads as well. For instance, some valve systems rotate a shaft to cam a valve open against the biasing force of a spring, wherein further rotation of the shaft allows the spring to bias the valve back closed. Thus, the spring supplies a negative cogging torque to the shaft (i.e., in a direction opposing rotation of the shaft) as the valve opens, and the spring supplies a positive cogging torque to the shaft (i.e., in the same direction as rotation of the shaft) as the valve closes. This cogging torque repeats cyclically as the shaft rotates about its axis.

Similarly, in an internal combustion engine, the crank shaft rotates to actuate a piston in an engine cylinder. As the volume in the cylinder is reduced and pressure increases therein (i.e., during the compression cycle), the crank shaft can experience a resultant negative cogging torque. Conversely, as the volume is increased and pressure decreases therein, the crank shaft can experience a resultant positive cogging torque. Cogging torque can be especially noticeable if combustion is not actually occurring (e.g., during engine startup, where one or more cylinders are deactivated, etc.).

SUMMARY

This section provides a general summary of the disclosure, and is not a comprehensive disclosure of its full scope or all of its features.

An anti-cogging apparatus is provided and includes a first support member, a second support member, a first set of magnets, and a second set of magnets. The first support member is configured to be connected to and rotate with a rotatable shaft. The second support member that does not rotate and is configured not to move with the first support member. The first set of magnets is mounted on the first support member in either an alternating polarity or non-alternating polarity configuration. The second set of magnets is mounted on the second support member in either an alternating polarity or non-alternating polarity configuration. The first set of magnets magnetically interacts with the second set of magnets to provide an anti-cogging torque on the rotatable shaft.

In other features, the first support member is configured to be (i) directly connected to and rotate with the rotatable shaft, or (ii) connected through a gearset or speed varying device to the rotatable shaft.

In other features, a number and an arrangement of the first set of magnets, the second set of magnets are such that the anti-cogging torque provided to the rotatable shaft corresponds to cogging inputs to the rotatable shaft.

In other features, the first support member is configured to be connected through a gearset to the rotatable shaft. The first set of magnets, the second sets of magnets and the gearset are configured such that the anti-cogging torque acting on the rotatable shaft corresponds to cogging inputs acting on the rotatable shaft.

In other features, a system is provided and includes a first support member, a second support member, a first set of magnets, a second set of magnets, and an actuator. The first support member is configured to be connected to and rotate with a rotatable shaft. The second support member that does not rotate and is configured not to move with the first support member. The first set of magnets is mounted on the first support member. The second set of magnets is mounted on the second support member. The first set of magnets magnetically interacts with the second set of magnets to provide an anti-cogging torque on the rotatable shaft. The actuator is configured to axially displace one or more magnets in the first set of magnets or in the second set of magnets to adjust the anti-cogging torque applied to the rotatable shaft.

In other features, the first support member is configured to be (i) directly connected to and rotate with the rotatable shaft, or (ii) connected through a gearset or speed varying device to the rotatable shaft.

In other features, a number and an arrangement of the first set of magnets, the second set of magnets are such that the anti-cogging torque provided to the rotatable shaft corresponds to cogging inputs to the rotatable shaft.

In yet other features, an anti-cogging apparatus is provided and includes a first support member, a second support member, a first set of magnets, a second set of magnets, and a backing plate. The first support member is configured to be connected to and rotate with a rotatable shaft. The second support member is configured not to move with the first support member. The first set of magnets is mounted on the first support member. The second set of magnets is mounted on the second support member. The first set of magnets magnetically interacts with the second set of magnets to provide an anti-cogging torque on the rotatable shaft. The backing plate can be attached to the first set of magnets, and/or to the second set of magnets. The backing plate includes one or more magnetically conductive layers and may have one or more insulation layer. The one or more insulation layer may be disposed between corresponding pairs of the magnetically conductive layers.

In other features, the first support member is configured to be (i) directly connected to and rotate with the rotatable shaft, or (ii) connected through a gearset or speed varying device to the rotatable shaft.

In other features, a number and an arrangement of the first set of magnets and the second set of magnets is such that the anti-cogging torque provided to the rotatable shaft corresponds to cogging inputs to the rotatable shaft.

In other features, an apparatus is provided that improves rotation of a rotatable shaft. The rotatable shaft has a cyclical cogging torque acting thereon in a first direction. The apparatus includes a support member, a first anti-cogging member, a second anti-cogging member, a cam surface, at least one abutment member, and at least one biasing member. The support member is adjacent the rotatable shaft. The rotatable shaft is operable to rotate relative to the support member. The first anti-cogging member is coupled to the support member. The second anti-cogging member is coupled directly or indirectly to the rotatable shaft to rotate based on rotation of the shaft. The cam surface has at least one lobe that is included on one of the first and second anti-cogging members. The at least one abutment member is coupled to the other of the first and second anti-cogging members. The at least one abutment member is operable to abut against the cam surface to provide an anti-cogging torque to the rotatable shaft in a second direction that opposes the first direction to at least partially offset the cogging torque. The at least one biasing member biases the at least one abutment member toward the cam surface.

In other features, an apparatus is provided that improves rotation of a rotatable shaft about an axis. The rotatable shaft has a cyclical cogging torque acting thereon in a first direction. The apparatus includes a device, a differential speed assembly, an abutment member, and a control module. The device rotates relative to the rotatable shaft and has a cam surface. The differential speed assembly connects the device to the rotatable shaft while allowing the rotatable shaft to rotate at a different speed than the rotatable shaft. The abutment member is coupled to the support member and configured to provide an anti-cogging torque to the rotatable shaft in a second direction that opposes the first direction to at least partially offset the cogging torque. The control module controls an amount of the anti-cogging torque provided to the rotatable shaft.

In other features, a method of improving rotation of a rotatable shaft about an axis is provided. The rotatable shaft has a cyclical cogging torque acting thereon in a first direction. The method includes rotating the shaft to cause relative rotation between an abutment member and a camming member. The camming member is configured to interact with the abutment member to provide an anti-cogging torque to the rotatable shaft in a second direction that opposes the first direction to at least partially offset the cogging torque. The method further includes selectively varying an amount of the anti-cogging torque provided to the rotatable shaft.

In still other features, an apparatus that improves rotation of a rotatable shaft is disclosed. The rotatable shaft has a cyclical cogging torque acting thereon in a first direction. The apparatus includes a support member that is adjacent the rotatable shaft, and the rotatable shaft is operable to rotate relative to the support member The apparatus also includes a first anti-cogging member and a second anti-cogging member that is coupled directly or indirectly to the rotatable shaft for rotation therewith. The apparatus also includes a cam surface that is included on one of the first and second members. Moreover, the apparatus includes an abutment member that is coupled to the other of the first and second members. The abutment member is operable to abut against the cam surface to provide an anti-cogging torque to the rotatable shaft in a second direction that opposes the first direction to at least partially offset the cogging torque.

In other features, the second anti-cogging member is coupled to the rotatable shaft via a differential speed assembly. In other features, a number and arrangement of abutment members on the first and second members, in conjunction with a differential speed assembly are such that anti-cogging inputs applied to the rotatable shaft correspond to cogging inputs applied to the rotatable shaft.

Also, an apparatus that improves rotation of a rotatable shaft about an axis is disclosed. The rotatable shaft has a cyclical cogging torque acting thereon in a first direction. The apparatus includes a first support member that is coupled to the rotatable shaft for rotation therewith and a second support member that is adjacent the first support member. The first support member is operable to rotate relative to the second support member. A plurality of first magnetic members is coupled to one of the first and second support members, and the plurality of first magnetic members includes at least one inner magnetic member disposed at a first radial distance from the axis and at least one outer magnetic member disposed at a second radial distance from the axis. The apparatus also includes a second magnetic member coupled to the other of the first and second support members. The second magnetic member is disposed at a third radial distance from the axis, which is greater than the first radial distance and less than the second radial distance. The second magnetic member is operable to magnetically interact with the at least one inner magnetic member and the at least one outer magnetic member to provide an anti-cogging torque to the rotatable shaft in a second direction that opposes the first direction to at least partially offset the cogging torque.

In other features, the first support member is configured to be (i) directly connected to and rotate with the rotatable shaft, or (ii) connected through a gearset or speed varying device to the rotatable shaft.

Moreover, an apparatus that improves rotation of a rotatable shaft about an axis is disclosed. The rotatable shaft has a cyclical cogging torque acting thereon in a first direction. The apparatus includes a first support member that is coupled to the rotatable shaft for rotation therewith and a second support member that is adjacent the first support member. The first support member is operable to rotate relative to the second support member. The apparatus also includes a first magnetic member coupled to one of the first and second support members and a second magnetic member coupled to the other of the first and second support members. The second magnetic member is operable to magnetically interact with the first magnetic member to provide an anti-cogging torque to the rotatable shaft in a second direction that opposes the first direction to at least partially offset the cogging torque. Furthermore, the apparatus includes a controller that controls and varies an amount of the anti-cogging torque provided to the rotatable shaft.

In other features, the first support member is configured to be (i) directly connected to and rotate with the rotatable shaft, or (ii) connected through a gearset or speed varying device to the rotatable shaft.

Still further, a method of improving rotation of a rotatable shaft about an axis is disclosed. The rotatable shaft has a cyclical cogging torque acting thereon in a first direction. The method includes rotating the shaft to cause relative rotation between a first magnetic member and a second magnetic member. The second magnetic member is operable to magnetically interact with the first magnetic member to provide an anti-cogging torque to the rotatable shaft in a second direction that opposes the first direction to at least partially offset the cogging torque. The method also includes selectively varying an amount of the anti-cogging torque provided to the rotatable shaft.

In other features, the first support member is configured to be (i) directly connected to and rotate with the rotatable shaft, or (ii) connected through a gearset or speed varying device to the rotatable shaft.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 19A-19B are perspective and side views of an inner wedge in accordance with the present disclosure;

Figure 20:
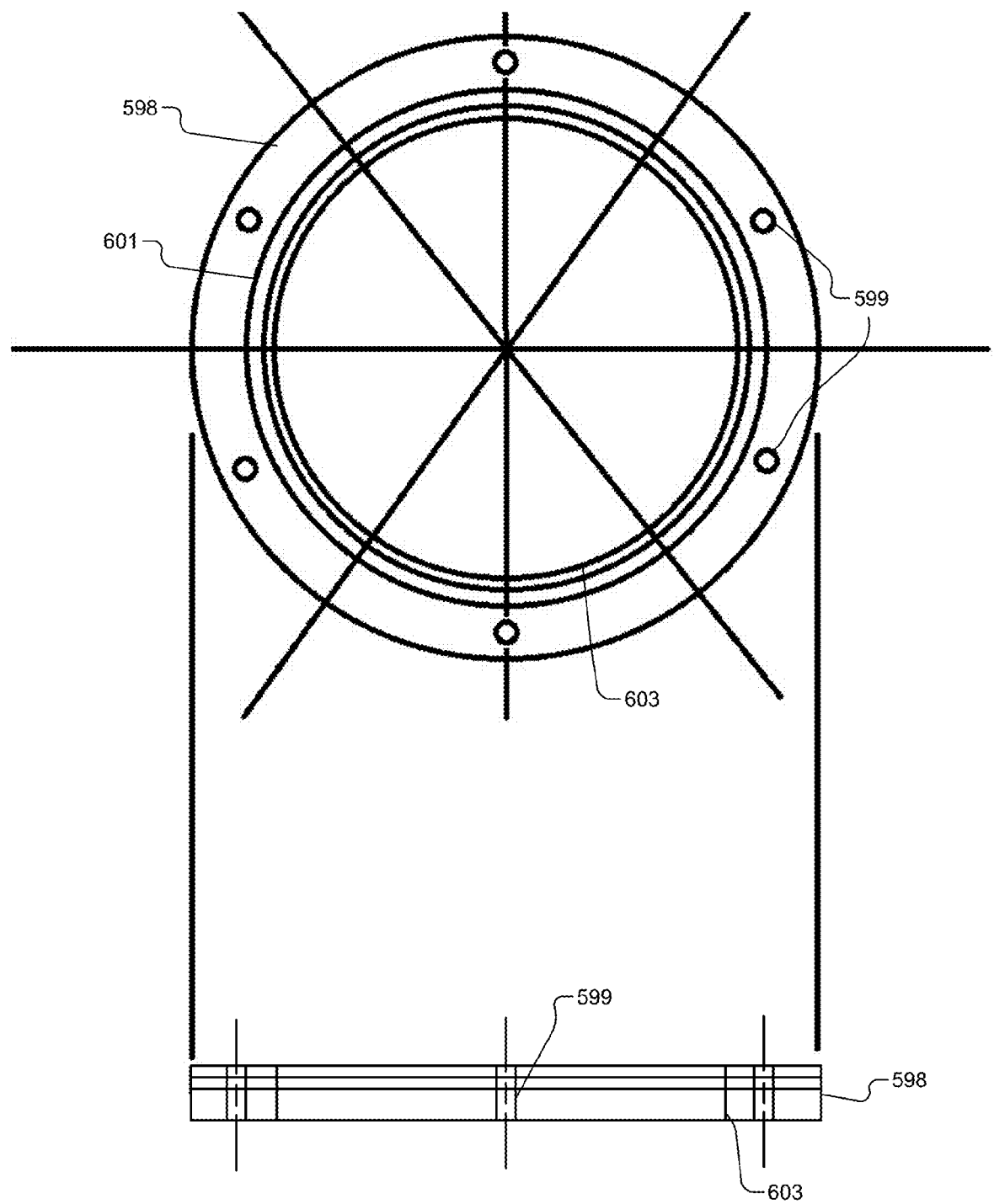
Figure 21:
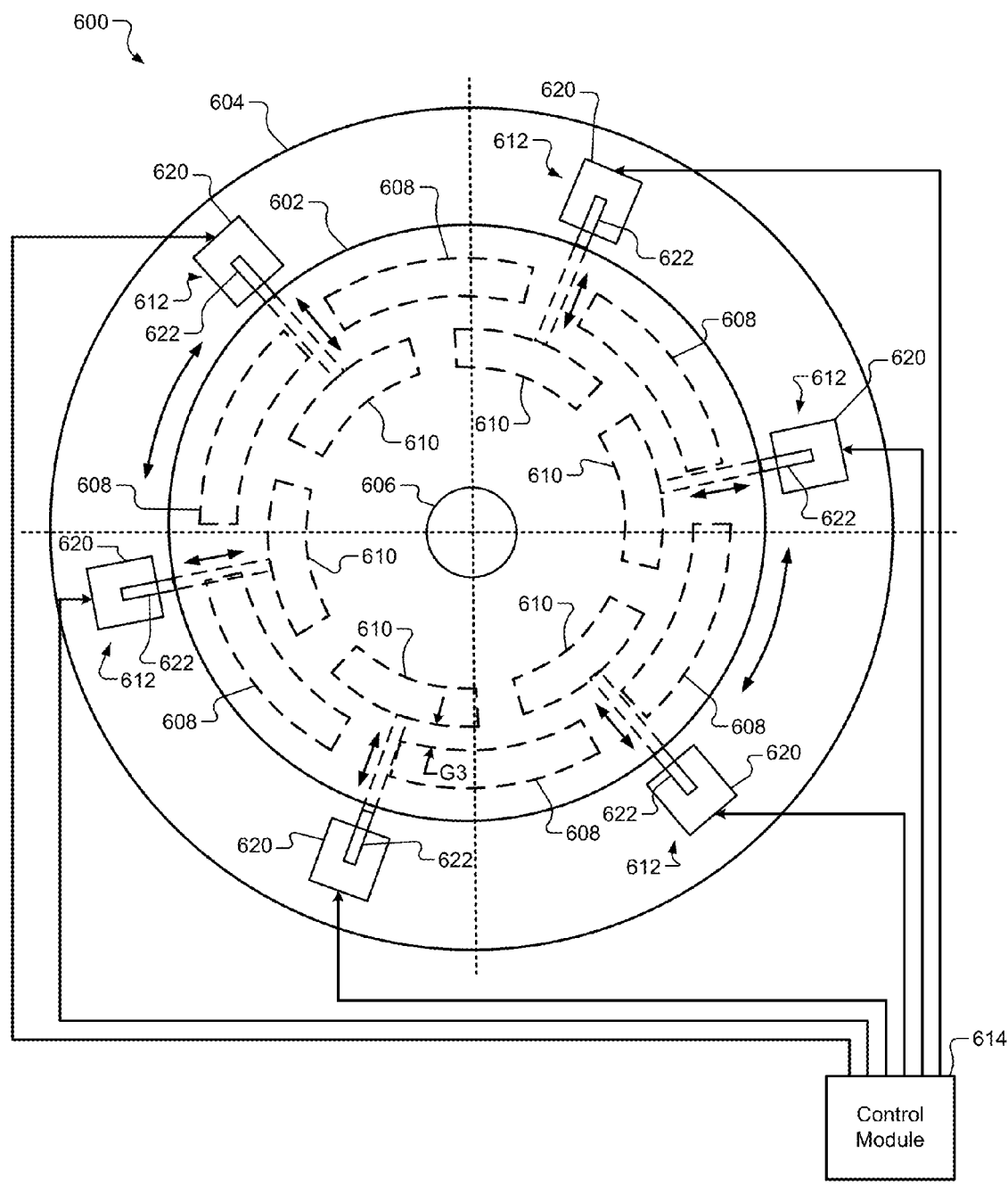
Figure 22:
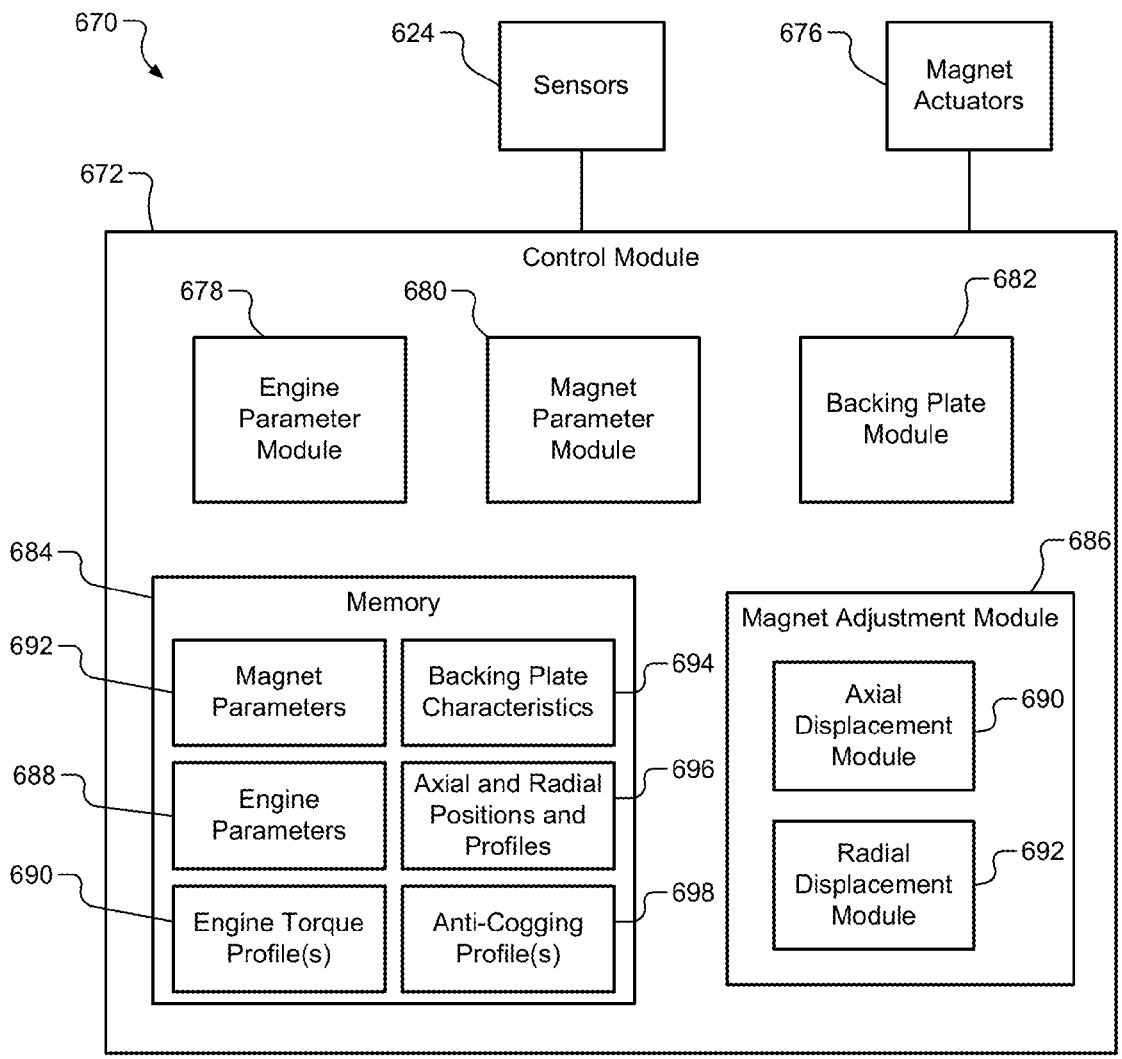
Figure 23:
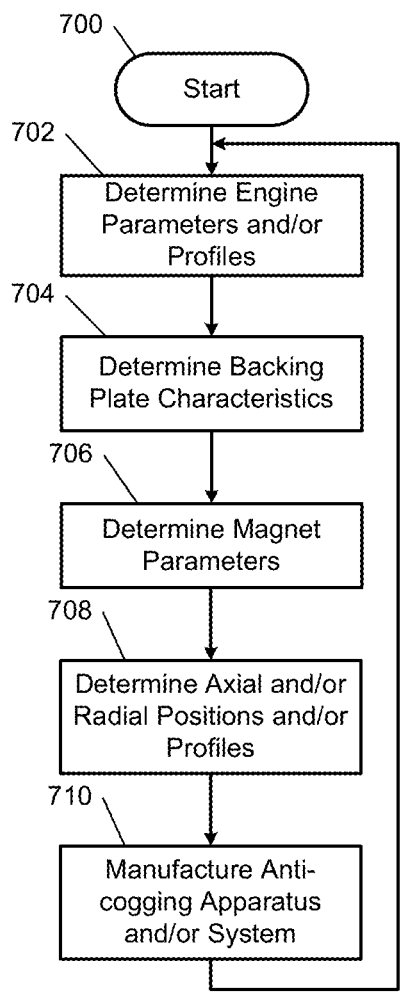
Figure 24:
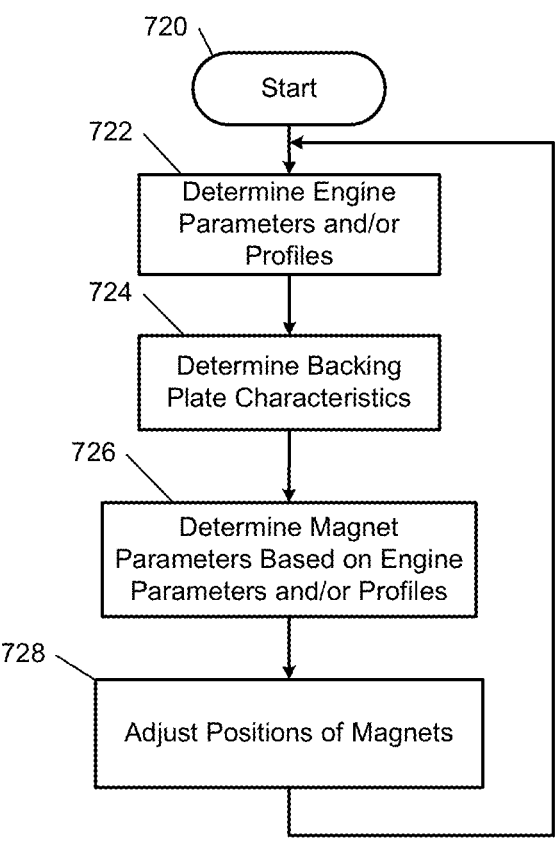
Figure 25:
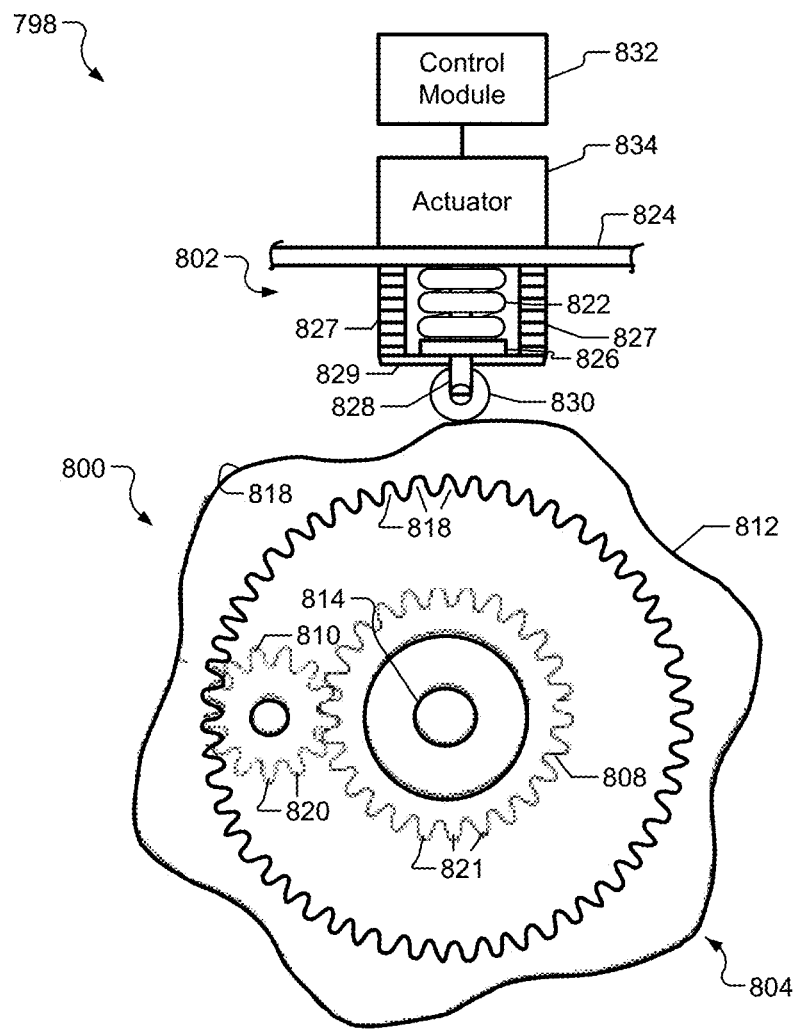
Figure 26:
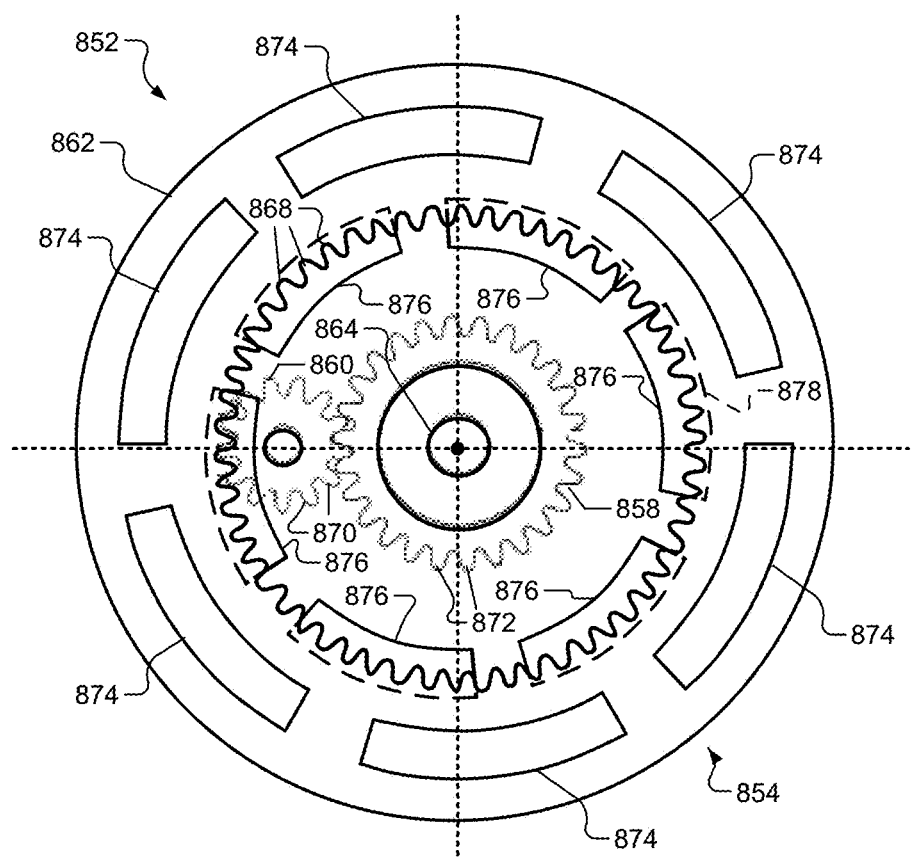
Figure 28:
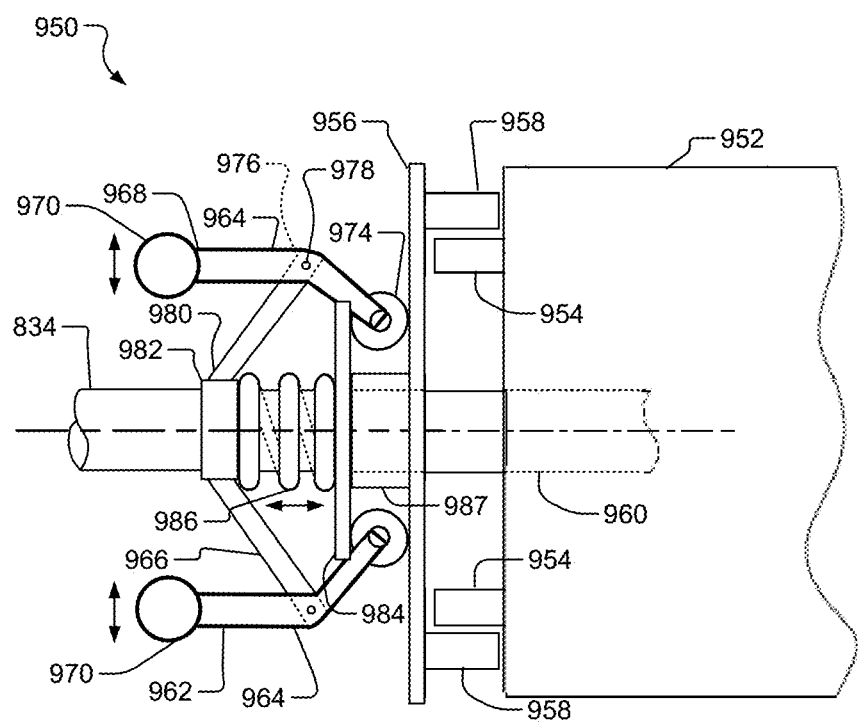
Figure 29:
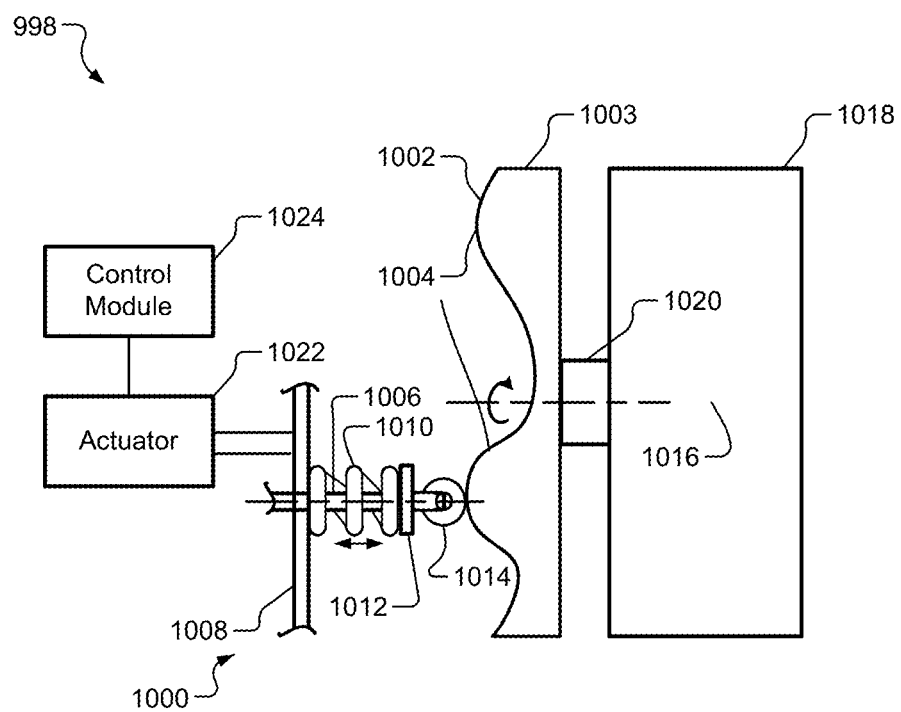
Figure 30:
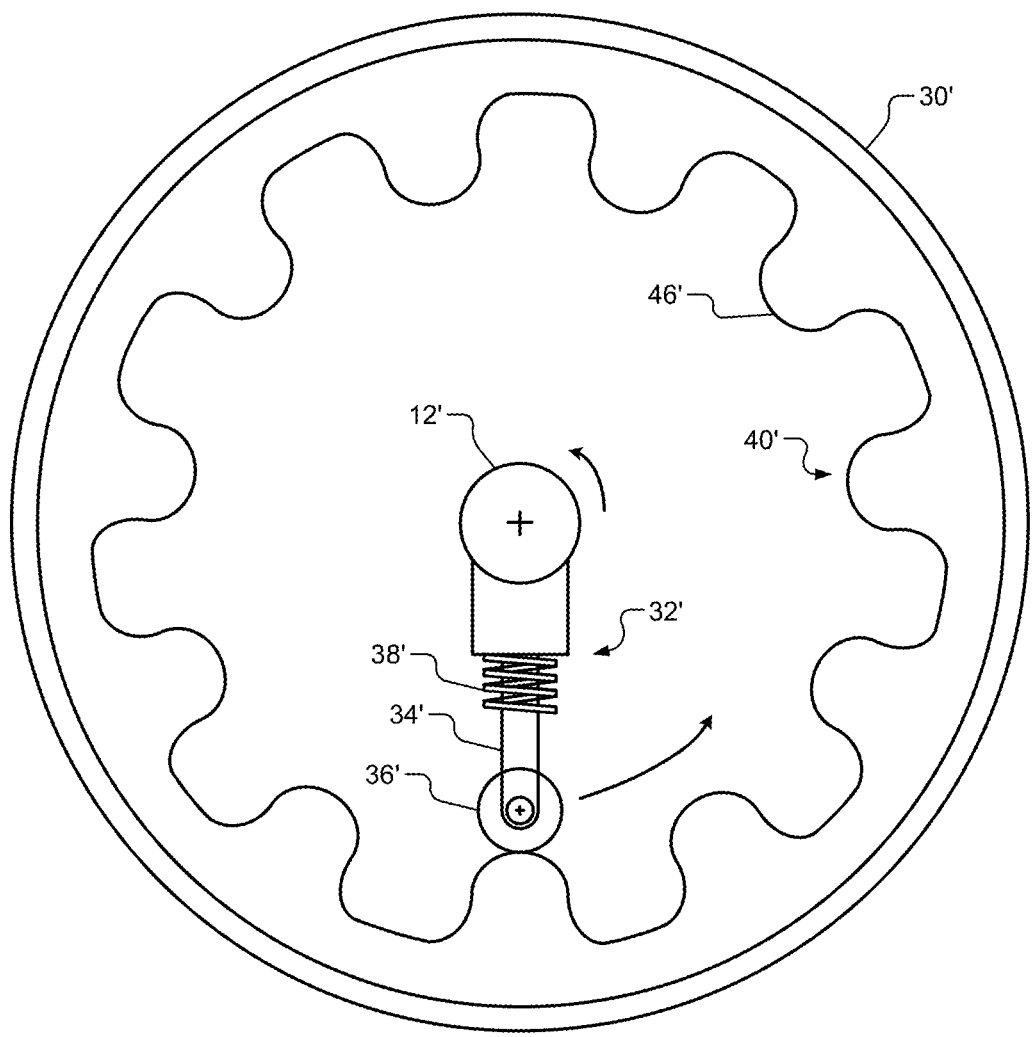

FIG. 20 includes side and end views of a retaining ring in accordance with the present disclosure;

FIG. 21 is a radial displacement system in accordance with the present disclosure;

FIG. 22 is a functional block diagram of an anti-cogging control system in accordance with the present disclosure;

FIG. 23 illustrates a method of manufacturing an anti-cogging apparatus and/or system in accordance with the present disclosure;

FIG. 24 illustrates a method of operating an anti-cogging apparatus and/or system in accordance with the present disclosure;

FIG. 25 is a diagram illustrating an anti-cogging system and an end view of a differential speed assembly for an anti-cogging apparatus in accordance with the present disclosure;

FIG. 26 is an end view illustrating a differential speed assembly for another anti-cogging apparatus in accordance with the present disclosure;

FIGS. 27A and 27B are functional block diagrams of an anti-cogging system illustrating states of a centrifugal anti-cogging apparatus in accordance with the present disclosure;

FIG. 28 is a side view of another centrifugal anti-cogging apparatus in accordance with the present disclosure;

FIG. 29 is a diagram of an anti-cogging system illustrating a side view of an anti-cogging apparatus incorporating a cam surface with lobes extending in an axial direction and in accordance with the presented disclosure; and FIG. 30 is a front, sectional view of an apparatus that improves rotation of a rotatable shaft according to various exemplary embodiments of the present disclosure.

Corresponding reference numerals indicate corresponding parts throughout the several views of the drawings.

DETAILED DESCRIPTION

Example embodiments will now be described more fully with reference to the accompanying drawings.

Mechanical System

Figure 1:
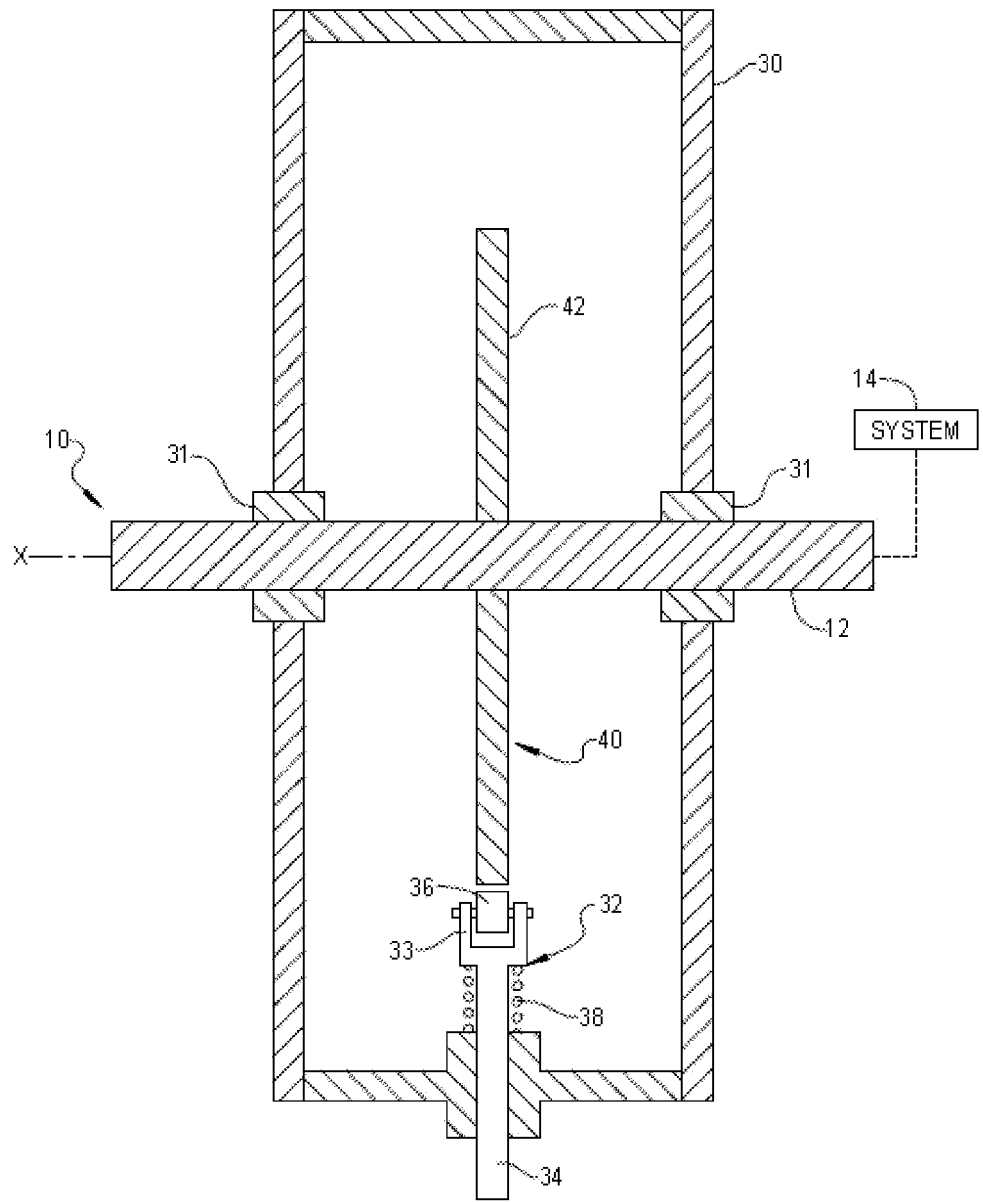
FIG. 1 is a side, sectional view of an apparatus that improves rotation of a rotatable shaft according to various exemplary embodiments of the present disclosure.

Referring initially to FIG. 1, an anti-cogging apparatus 10 is illustrated according to various exemplary embodiments. The apparatus 10 can be operably coupled to a rotatable shaft 12, and the shaft 12 can be part of or otherwise connected to a system 14, such as an electric motor, a crankshaft of an internal combustion engine, a camming system, etc. as will be discussed. A surface having one or more lobes may be referred to herein as a cam surface. A component having a cam surface, such as a camshaft, may be referred to as a cam or camming element.

Operation of the system 14 can impart a cyclical load (i.e., a cogging load or cogging torque) on the shaft 12. For instance, if the system 14 is a known electric motor and the shaft 12 is the output shaft of that motor, cogging torque can occur due to magnetic interaction between the magnets of the rotor and the stator poles. This cogging can occur cyclically at known rotational angles of the shaft 12 relative to the rotational axis X. Thus, the cogging can occur N times during every rotation at predetermined angular positions.

However, the anti-cogging apparatus 10 can facilitate rotation of the rotatable shaft 12 despite this cogging torque as will be discussed in greater detail below. The apparatus 10 generates anti-cogging loads that at least partially offset the cogging loads to thereby facilitate rotation of the shaft 12.

Figure 11:
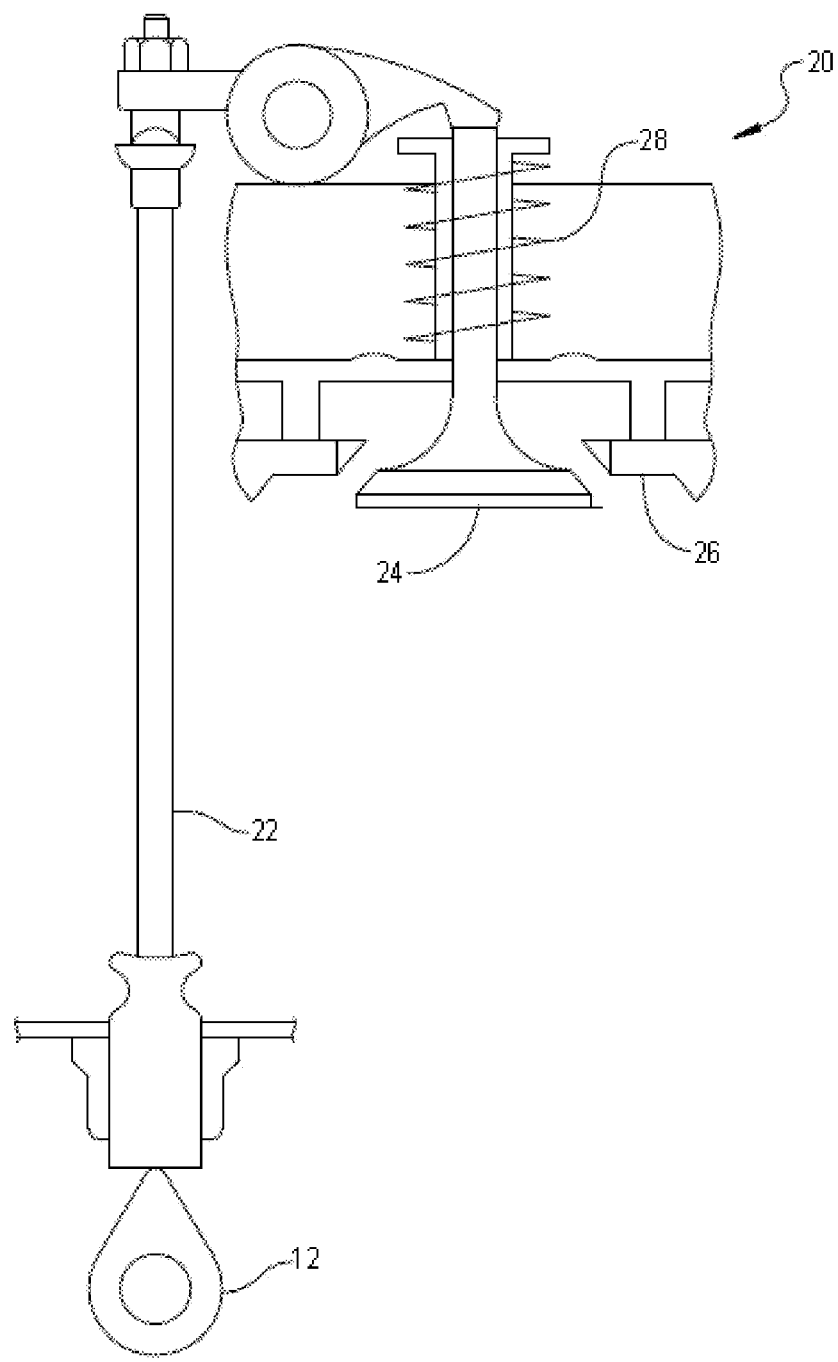
FIG. 11 is a schematic view of a cam system that can be operably coupled to the anti-cogging apparatus of the present disclosure.

It will be appreciated that the term "cogging" is defined broadly herein to mean any torque load that is imparted on the shaft 12 cyclically at known rotational angles of the shaft 12. Thus, the system 14 could be an electric motor as mentioned above. The system 14 could also be an internal combustion engine, and the shaft 12 could be the crankshaft of the engine, wherein the "cogging" is imparted on the crankshaft as a piston moves within a cylinder to vary pressure therein. The system 14 could also be a known cam system 20 (FIG. 11) and the shaft 12 can be an input shaft that cams a pushrod 22 in one direction to thereby push a valve 24 away from its seat 26 against the biasing force of a biasing member 28. Further rotation of the shaft 12 allows the biasing member 28 to bias the valve 24 back toward the seat 26. Thus, the varying biasing loads from the biasing member 28 can impart a "cogging" on the shaft 12. It will be appreciated, though, that the system 14 could be of any other type without departing from the scope of the present disclosure.

Figure 2:
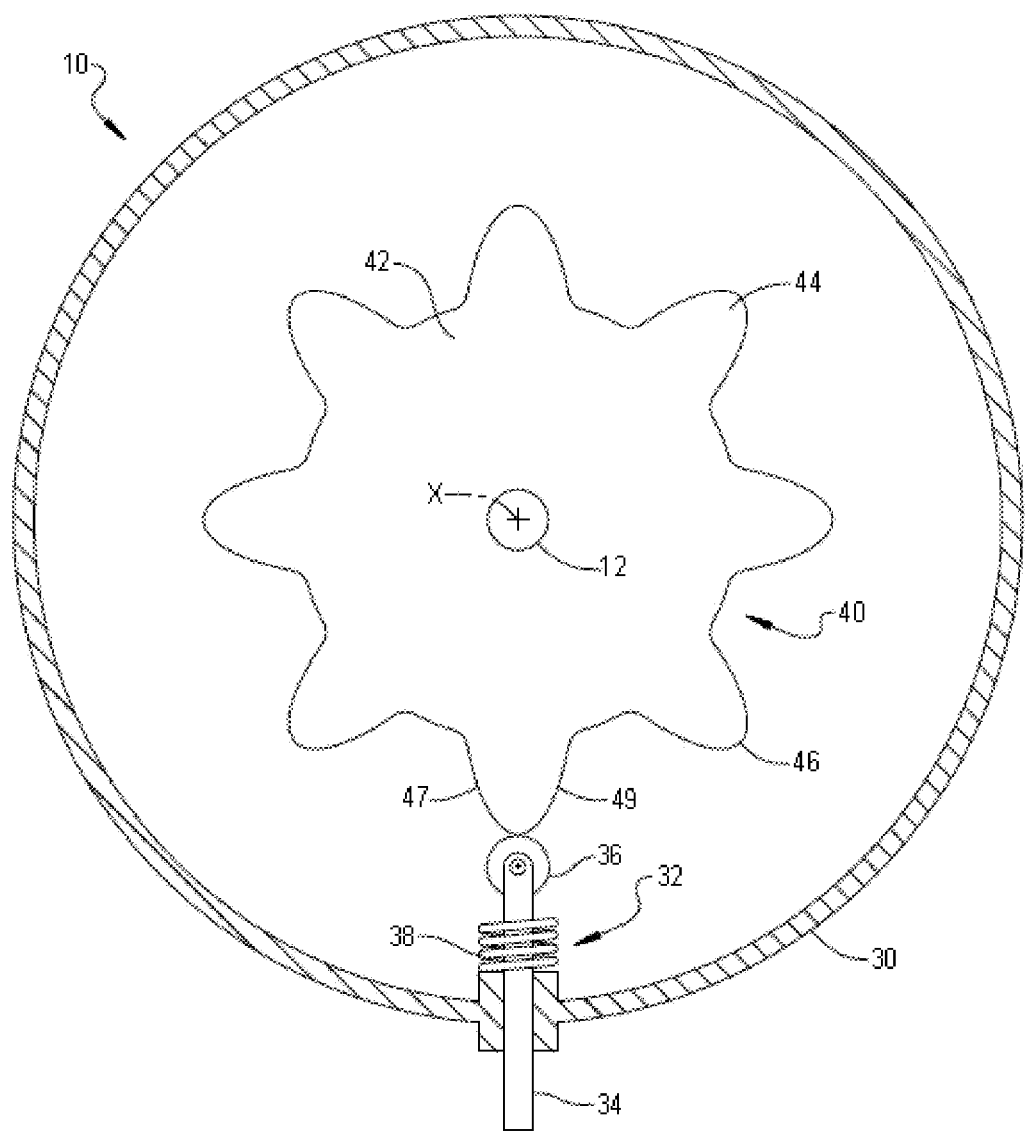
FIG. 2 is a front, sectional view of the apparatus of FIG. 1.
Figure 3:
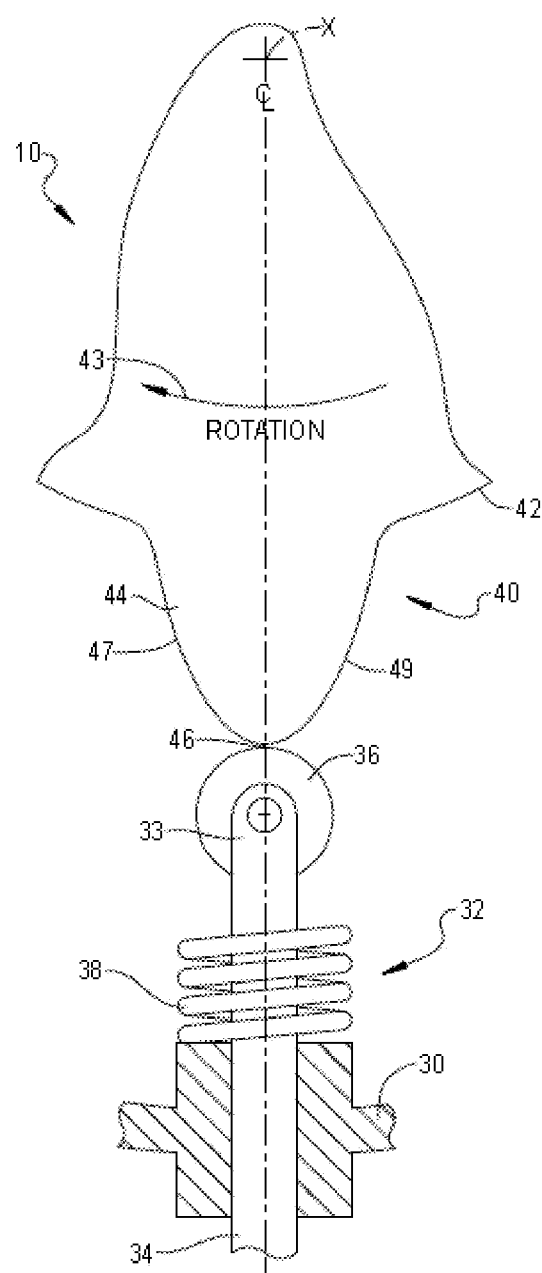
FIG. 3 is a front, detail view of the apparatus of FIG. 1.

Referring now to FIGS. 1-3, the anti-cogging apparatus 10 will be discussed in greater detail. As shown, the apparatus 10 can include a support member 30 or housing. The support member 30 can be of any suitable shape and construction and can be disposed adjacent the shaft 12. Specifically, the shaft 12 can extend through the support member 30 and can be rotatably supported thereon by one or more bearings 31. Thus, the shaft 12 can rotate relative to the support member 30.

The apparatus 10 can also include a first anti-cogging member 32. The first anti-cogging member 32 can include a rod 34 and an abutment member 36. The rod 34 can be slidably attached to the support member 30 and can slide radially toward and away from the rotational axis X of the shaft 12. Also, in the embodiments illustrated, the abutment member 36 can be a small wheel or roller that is rotatably attached to a forked end 33 of the rod 34; however, the abutment member 36 could be fixed to the rod 34 in some embodiments.

The first anti-cogging member 32 can also include a biasing member 38. The biasing member 38 can be a helical compression spring that is disposed between the forked end 33 of the rod 34 and the support member 30. However, the biasing member 38 could be of another type. The biasing member 38 can bias the abutment member 36 toward the axis of rotation X of the shaft 12.

The apparatus 10 can further include a second anti-cogging member 40. As shown in FIG. 2, the second anti-cogging member 40 can include a cam 42 that is coupled (e.g., fixed) to the shaft 12 for rotation therewith. The cam 42 can include one or more lobes 44 that extend radially away from the axis of rotation X. The lobes 44 can each include a rounded cam surface 46. The cam surface 46 for each lobe 44 can include a leading surface 47 and a trailing surface 49 as shown in FIGS. 2 and 3. Any number of anti-cogging members may be included. Each anti-cogging member and/or cam may include any number of cam lobes. The number of anti-cogging members and the number of cam lobes on each of the anti-cogging members may be selected to provide a resulting number of anti-cogging pulses per revolution of the shaft 12 and/or the cam 42 that is equal to the number of cogging pulses per revolution of the shaft 12 and/or the cam 42.

In the embodiments shown, the cam 42 can include a plurality of lobes 44 that are spaced apart at equal rotational angles about the axis X. In FIG. 2, for instance, the cam 42 includes eight lobes 44 that are spaced apart approximately every forty-five degrees (45°) about the axis X. It will be appreciated, however, that the cam 42 can include any number of lobes 44, and the lobes 44 can be spaced apart at any rotational angle. Moreover, the number of lobes 44 and spacing between the lobes 44 can be configured according to the rotational angles at which cogging occurs on the shaft 12 as will be discussed.

The abutment member 36 can rollingly abut against the cam 42 as the cam 42 rotates with the shaft 12. Specifically, the shaft 12 and cam 42 can be driven in rotation by the system 14 about the axis X in the first direction 43 (FIG. 3). As the abutment member 36 rolls along the leading surface 47 of the lobe 44, the leading surface 47 can push the abutment member 36 and the rod 34 radially away from the axis X against the biasing force of the biasing member 38. As the cam 42 further rotates, the abutment member 36 can roll along the trailing surface 49, and the biasing force of the biasing member 38 can, in turn, impart the anti-cogging torque on the shaft 12 in the first direction 43. The abutment member 36 can sequentially abut against the trailing surface 49 of each lobe 44 such that the anti-cogging torque is applied sequentially to the shaft 12 (i.e., at known rotational angles).

Figure 8:
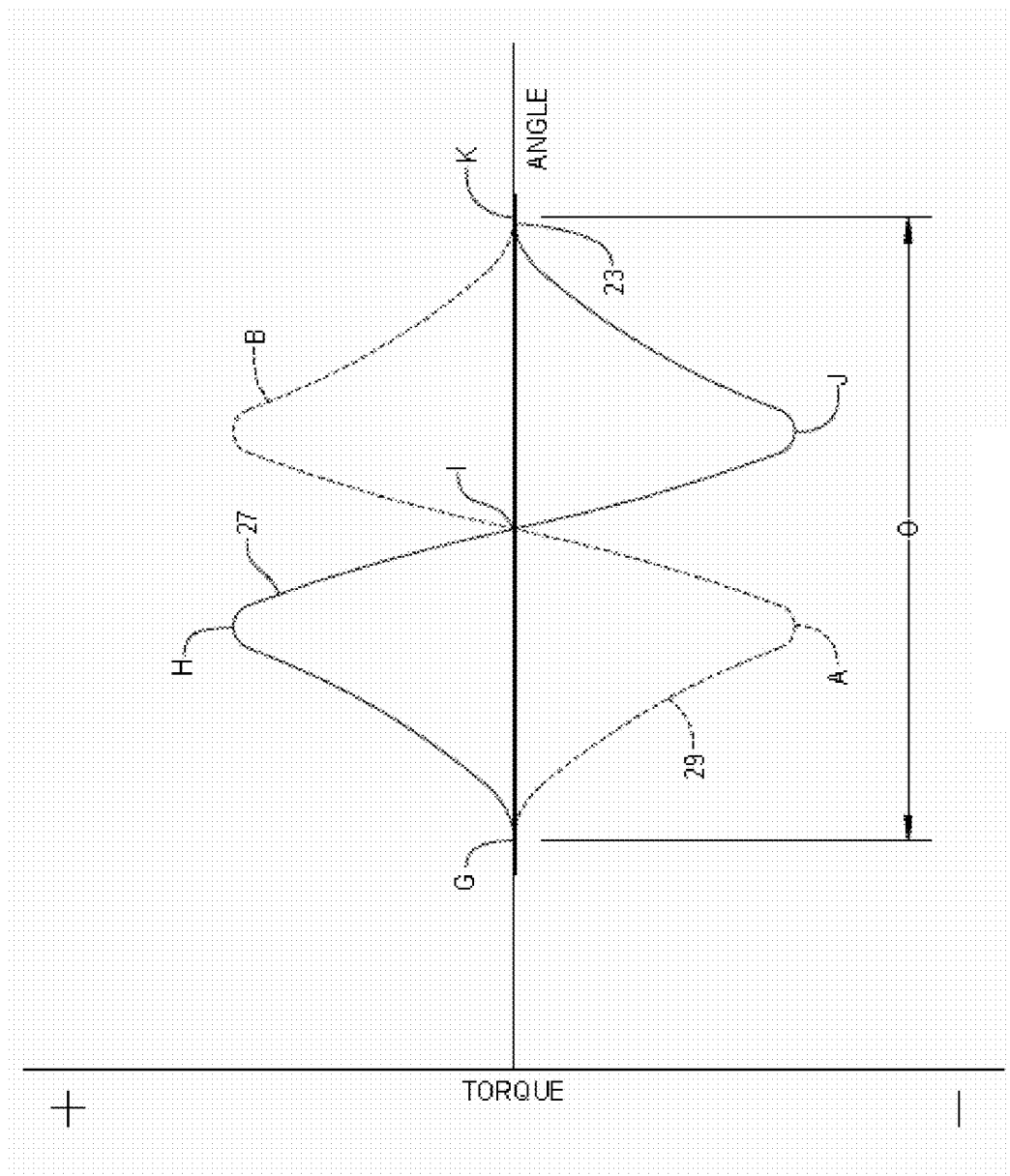
FIG. 8 is a graph representing operation of the apparatus of the present disclosure showing how the apparatus offsets cyclical cogging torque.

As shown in FIG. 8, the anti-cogging torque (represented by broken line 29) and the cogging torque (represented by solid line 27) can be applied substantially simultaneously. Also, the anti-cogging torque can be approximately equal, but opposite, to the cogging torque to substantially offset the cogging torque.

Specifically, FIG. 8 shows at 27 a single cogging torque pulse, which has a substantially sinusoidal profile as is known in the prior art. At point G, the leading edge of the windings could be aligned with the trailing edge of respective ones of the machine's permanent magnets, thereby imparting approximately no torque on the shaft 12. Then, as the shaft 12 further rotates, positive cogging torque (i.e., torque directed along the same direction as rotation of the shaft 12) increases toward a maximum point H, where the windings are spaced approximately half way across an air gap between adjacent permanent magnets. Subsequently, cogging torque can decrease back to approximately zero (point I), where the windings are spaced at the center of the air gap between adjacent magnets. Then, the cogging torque can decrease to a maximum negative value (point J), where the windings are approximately half way out of the air gap. Next, the cogging torque can increase back toward zero (point K), because the windings have advanced enough to align with the adjacent magnets. It will be appreciated that this cogging torque can repeatedly and cyclically follow the profile graphically represented at 27 in FIG. 8.

However, FIG. 8 also shows the anti-cogging torque that the apparatus 10 provides to offset the cogging torque and provide a resulting torque of zero. Specifically, as the abutment member 36 rolls along the leading surface 47, a negative torque (torque opposing the direction of rotation of the shaft 12) is imparted on the shaft 12, as represented in region A of FIG. 8. Anti-cogging torque increases and then decreases back toward zero (point I) at which point the abutment member 36 is located at the land between the leading surface 47 and the trailing surface 49. Then, as the abutment member 36 rolls along the trailing surface 49, a positive torque is imparted on the shaft 12 as represented in region B of FIG. 8. Anti-cogging torque increases and then decreases back toward zero (point K).

As shown in FIG. 8, the anti-cogging torque pulse (regions A and B) is approximately equal but opposite to the cogging torque pulse 27 for a net of zero (represented by line 23 in FIG. 8). In other words, the angular position (8) at which cogging and anti-cogging occurs and the amounts of the cogging and anti-cogging torques are such that the cogging and anti-cogging torques can substantially offset each other. As such, the apparatus 10 can significantly improve efficiency of the system 14.

Figure 14:
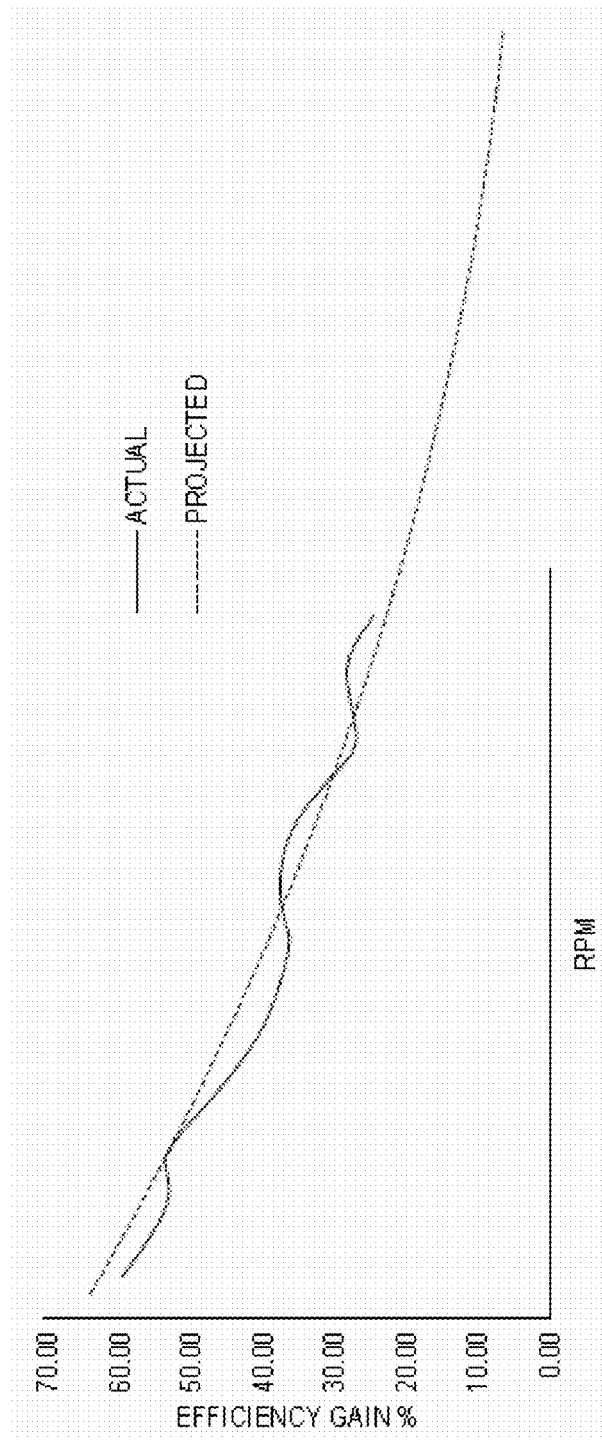
FIG. 14 is a graph representing efficiency gains that can be recognized using the anti-cogging apparatus of the present disclosure.

FIG. 14 illustrates exemplary improvements in efficiency in the system 14 when the apparatus 10 is used. As shown, the gains are most noticeable at lower RPMs, and the gains decrease as the rotational speed increases.

It will be appreciated that the apparatus 10 can be configured differently than those embodiments illustrated in FIGS. 1-3. For instance, the rod 34, abutment member 36, and biasing member 38 of the first anti-cogging member 32 could be fixed for rotation with the shaft 12 while the cam surface 46 could be fixed on the support member 30. An example of this is shown in FIG. 30. In FIG. 30 a shaft 12', a support member 30' having a cam surface 46', a first anti-cogging member 32', a rod 34', an abutment member 36', a biasing member 38', and a second anti-cogging member 40' are shown.

Also, there can be any number of first and second anti-cogging members 32, 40. For instance, if there are N number of cogging torque pulses per revolution of the shaft 12, there can be a single first anti-cogging member 32 and N number of lobes 44 on the second anti-cogging member 40 such that there are N anti-cogging torque pulses per revolution of the shaft 12. Alternatively, there can be N number of first anti-cogging members 32 and a single lobe 44 on the second anti-cogging member 40. Furthermore, there can be an amount A of first anti-cogging members 32 and an amount B of second anti-cogging members 40 such that the product of A and B is equal to N (A×B=N).

Still further, in some embodiments, the first and/or second anti-cogging members 32, 40 can be operably connected to the shaft 12 in any way other than that shown in FIGS. 1-3. For instance, where the system 14 is an electric motor, the second anti-cogging member 40 could be connected via a gearset (not shown) to the rotor of the electric motor, whereby the combination of gear ratio, the number of lobes 44, and the number of first anti-cogging members 32 produces the N number of anti-cogging torque pulses per revolution of the shaft 12.

Additionally, it will be appreciated that the amount of anti-cogging torque can be affected by the profile (e.g., slope) of the cam surface 46, the spring constant of the biasing member 38, etc. Thus, these features can be configured to produce the desired anti-cogging torque.

Figure 4:
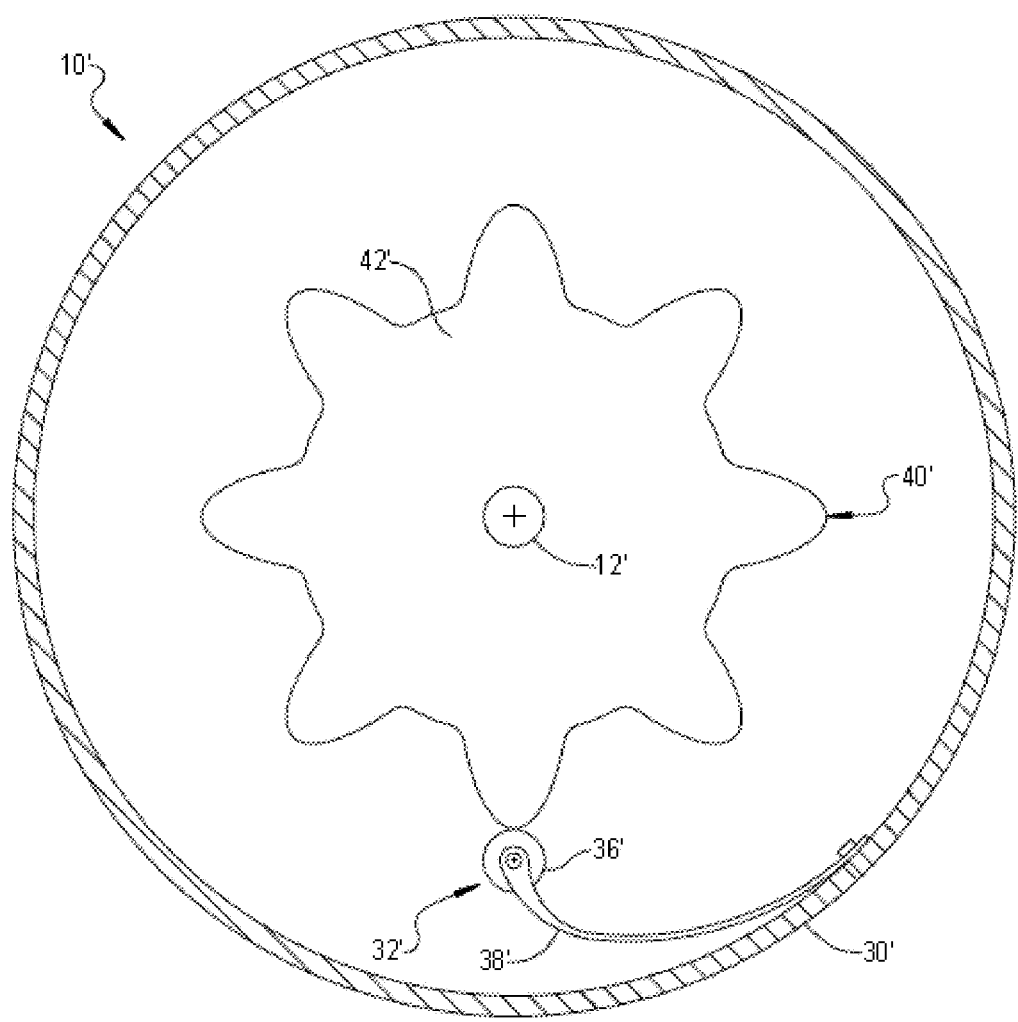
FIG. 4 is a front, sectional view of the apparatus of the present disclosure according to additional embodiments.

Moreover, the biasing member 38 could be of any type other than the helical spring illustrated in FIGS. 1-3. For instance, as shown in FIG. 4, the biasing member 38' of the first anti-cogging member 32' can include a leaf spring, a pneumatic cylinder and/or other potential energy storage device. Thus, the biasing member 38' can resiliently flex as the cam 42' rotates with the shaft 12' to supply the anti-cogging torque as discussed above.

Magnetic/Electrical System

Figure 5:
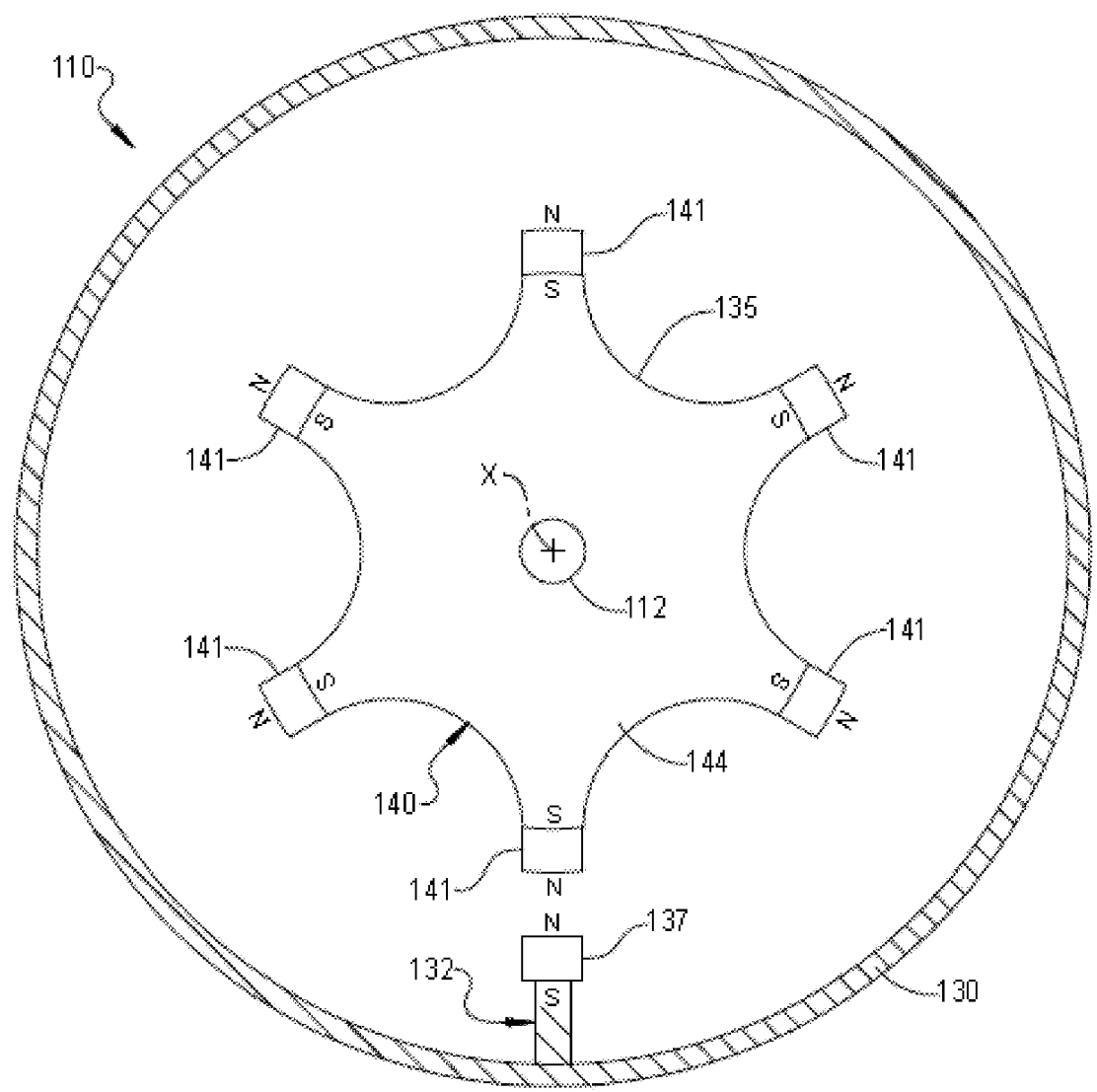
FIG. 5 is a front, sectional view of the apparatus of the present disclosure according to additional embodiments.
Figure 6:
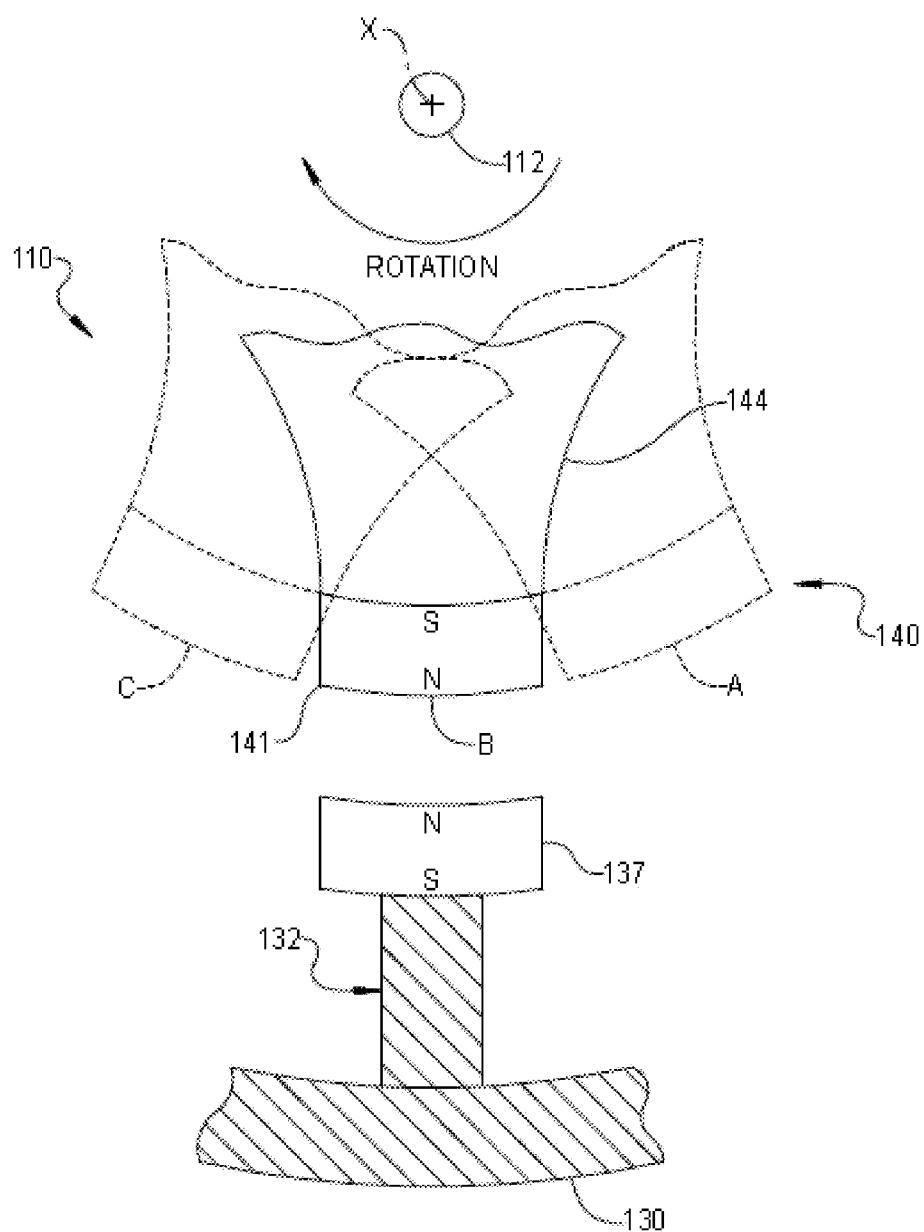
FIG. 6 is a front, detail view of the apparatus of FIG. 5.

Referring now to FIGS. 5 and 6, additional embodiments of the anti-cogging apparatus 110 will be discussed in detail. Components that correspond to those in the embodiments of FIGS. 1-3 are indicated with corresponding reference numerals increased by 100.

As shown, the anti-cogging apparatus 110 includes a first support member 130 and a second support member 135. The apparatus 110 includes at least one first anti-cogging member 132 and one or more second anti-cogging member 140. In the embodiments shown, the first anti-cogging member 132 can include a first magnetic member 137 (e.g., a permanent magnet), and the second anti-cogging members 140 can each include a second magnetic member 141. It will be appreciated that there can be any number of first and second magnetic members 137, 141.

The first magnetic member 137 can be fixed to the first support member 130 and can extend radially inward toward the rotational axis X. The second support member 135 can include a plurality of lobes 144 that extend radially away from the axis X, and the second magnetic members 140 can be fixed to the respective radial ends of the lobes 144. Thus, as the shaft 112 rotates about the axis X, the first magnetic member 137 can sequentially align in an imaginary straight radial line with the second magnetic members 141.

Also, the second magnetic members 141 can each be arranged with one magnetic pole (e.g., the north pole) facing radially outward. The first magnetic member 137 can be arranged with the same magnetic pole (e.g., the north pole) facing radially inward. Thus, as shown in FIG. 6, as one of the second magnetic members 141 moves immediately adjacent the first magnetic member 137, the magnetic members 137, 141 can magnetically repel each other.

FIG. 6 illustrates interaction between a single pair of first and second magnetic members 137, 141. When rotating from position A to position B, the magnetic members 137, 141 magnetically repel each other, resulting in a negative torque being applied to the shaft 112, which increases as the magnetic members 137, 141 approach each other and then begins to reduce as the moment arm acting on the shaft 112 decreases. (This is represented by region A in FIG. 8.) When the magnetic members 137, 141 are in position B shown in FIG. 6, the repulsive force therebetween is at a maximum. However, since the members 137, 141 are aligned radially, the moment arm (and the torque) is substantially zero. Then, as the magnetic members 137, 141 move to position C of FIG. 6, the repulsive force therebetween causes a positive torque on the shaft 112 as represented in region B of FIG. 8.

It will be appreciated that the amount of anti-cogging torque can be dependent upon the field strength of the magnetic members 137, 141, the radial distance between the magnetic members 137, 141, the size and shape of the magnetic members 137, 141, the radial distance of the magnetic members 137, 141 from the axis X, etc. Thus, each of these variables can be configured to produce the desired anti-cogging torque.

As discussed above, the number and relative position of the first and second magnetic members 137, 141 can be configured such that the anti-cogging torque is applied approximately concurrently with the cogging torque such that the two torques at least partially offset. Thus, the overall system efficiency can be improved, vibration of the shaft 112 can be reduced, etc.

Those having ordinary skill in the art will appreciate that the arrangement of the magnetic members 137, 141 could be varied such that the magnetic members 137, 141 magnetically attract each other. Whether the magnetic members 137, 141 attract or repel each other could depend on whichever arrangement most effectively offsets cogging.

Figure 7:
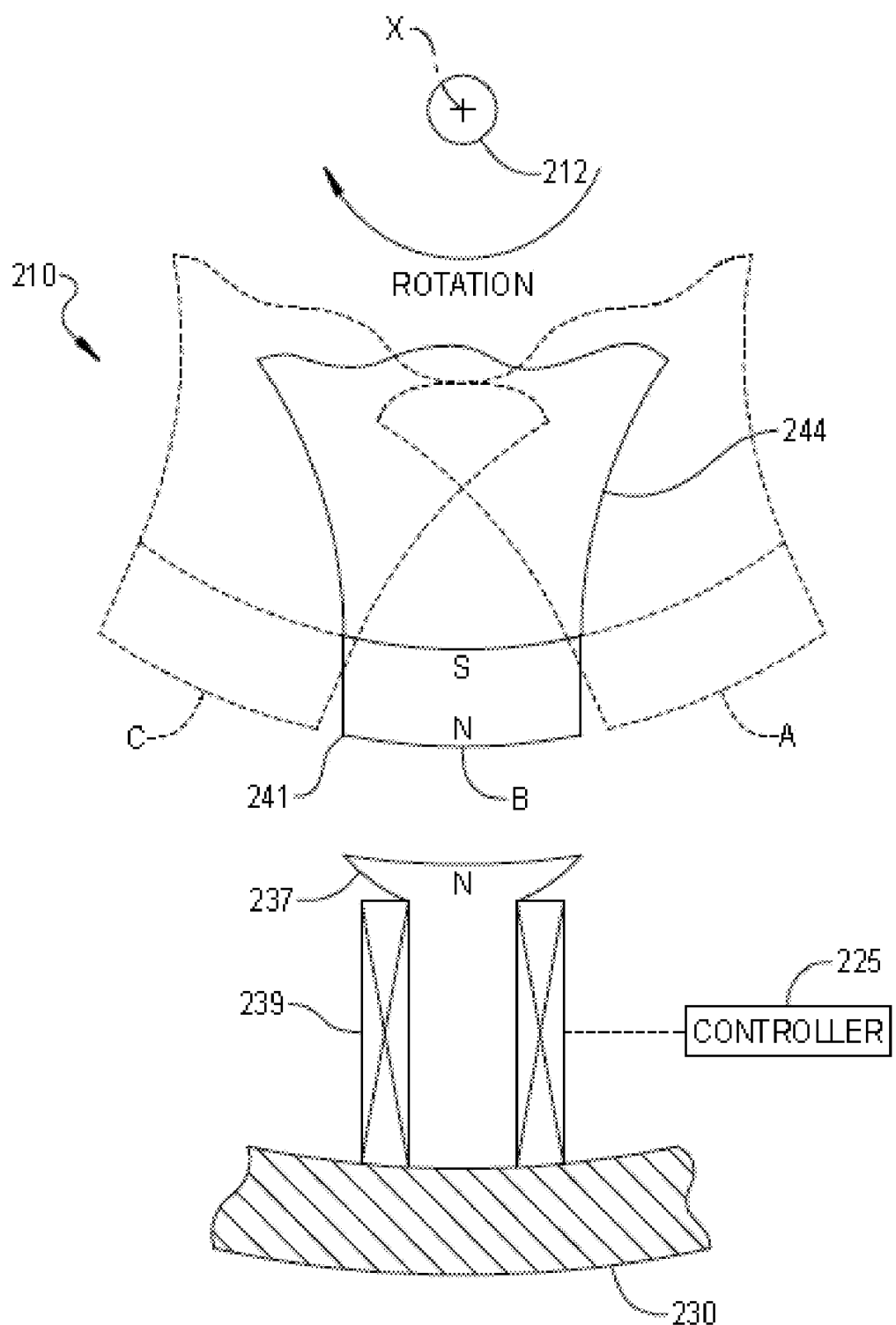
FIG. 7 is a front, detail view of the apparatus of the present disclosure according to additional embodiments.

Referring now to FIG. 7, the anti-cogging apparatus 210 will be discussed according to additional embodiments. Components that correspond to those in the embodiments of FIGS. 1-3 are indicated by corresponding reference numerals increased by 200.

As shown, the anti-cogging apparatus 210 can include first and second magnetic members 237, 241. However, the first magnetic member 237 can include a ferromagnetic material with windings 239 thereon. Thus, the first magnetic member 237 can operate as an electromagnet (i.e., with a magnetic flux that varies according to the current within the windings 239).

In the embodiments illustrated, the second magnetic member 241 includes permanent magnets. However, it will be appreciated that the second magnetic member 241 could include windings 239 to operate as an electromagnet while the first magnetic member 237 includes a permanent magnet. In still other embodiments, both the first and second magnetic members 237, 241 can include windings 239 to operate as electromagnets.

The windings 239 can be operably connected to a controller (or control module) 225, which is schematically illustrated in FIG. 7. The controller 225 can include a variable current source, programmed logic, etc., and the controller 225 can variably control the current flowing through the windings 239 to thereby vary the magnetic flux of the first magnetic member 237 during operation. As such, the controller 225 can vary the magnetic flux to thereby vary the anti-cogging torque imparted to the shaft 212.

The embodiments of FIG. 7 could be used where the apparatus 210 is operably coupled to an electric motor. In some cases, the magnetic flux in the pole cores of the motor might be varied to control the rotational speed of the shaft 212, which would change the cogging torque applied to the shaft 212. As a result, the controller 225 could control the amount of current flowing through the windings 239 to thereby vary the magnetic flux of the first magnetic member 237 to offset the varying cogging torque. Thus, the anti-cogging torque can be varied according to the amount of cogging torque applied to the shaft 212, according to the relative angular position of the first and second magnetic members 237, 241, etc.

In some embodiments, the controller 225 could be in communication with a known torque sensor (not shown) that automatically detects the amount of cogging torque applied to the shaft 212. As a result, the controller 225 could automatically adjust the magnetic flux of the first magnetic member 237 to supply an equal, but opposite, anti-cogging torque to the shaft 212.

Figure 9:
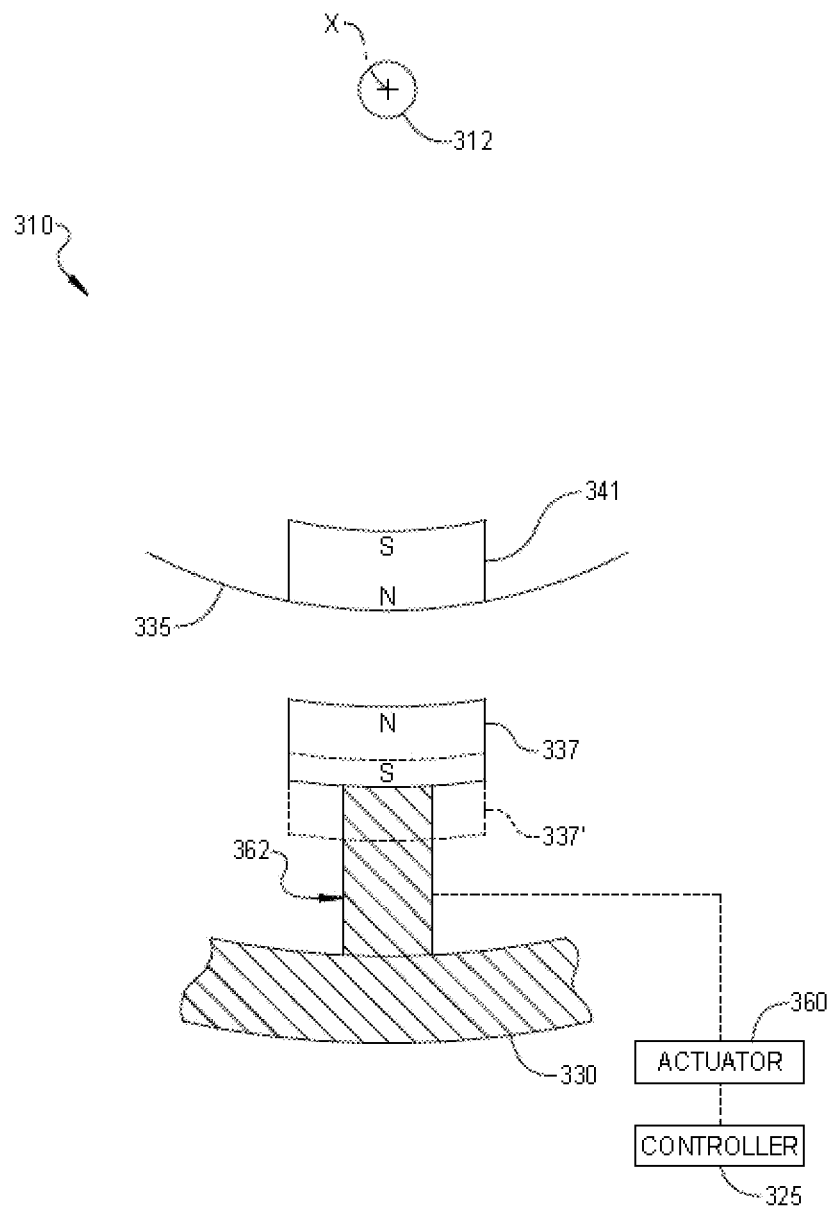
FIG. 9 is a front, detail view of the apparatus of the present disclosure according to additional embodiments.

Referring now to FIG. 9, additional embodiments of the anti-cogging apparatus 310 will be discussed. Components that correspond to components of the embodiments of FIGS. 1-3 are indicated with corresponding reference numbers increased by 300.

As shown, the first magnetic member 337 can be a permanent magnet that is fixed to a rod 362. The rod 362 can be moveably (e.g., slidably) coupled to the first support member 330 so as to be moveable toward and away from the axis X. In the embodiments illustrated, the rod 362 and first magnetic member 137 can move along a straight radial line relative to the axis X. (A first radial position is indicated at 337 and a second radial position is indicated at 337'.)

The rod 362 can also be operably coupled to an actuator 360, which actuates the rod 362 and magnetic member 137 radially. The actuator 360 can be of any suitable type, such as an electric actuator. In some embodiments, the rod 362 can be threaded to the support member 330, and the actuator 360 can threadably advance the rod 362 radially such that the rod 362 remains in place relative to the support member 330 even when the actuator 360 is switched OFF. The actuator 360 can be in communication with a controller (or control module) 325 for controlling radial movement of the first magnetic member 137.

Accordingly, the distance (i.e., the air gap) between the first magnetic member 337 and the second magnetic member 341 can be controlled by radially moving the first magnetic member 337. As the air gap is reduced, the anti-cogging torque is increased and vice versa. Thus, the anti-cogging torque imparted to the shaft 312 can be varied, for instance, according to the amount of cogging torque being applied to the shaft 312.

It will be appreciated that the second magnetic member 341 could be moveable radially relative to the axis X instead of or in addition to the first magnetic member 337. It will also be appreciated that both magnetic members 337, 341 could be moveable by the actuator 360.

Figure 10A:
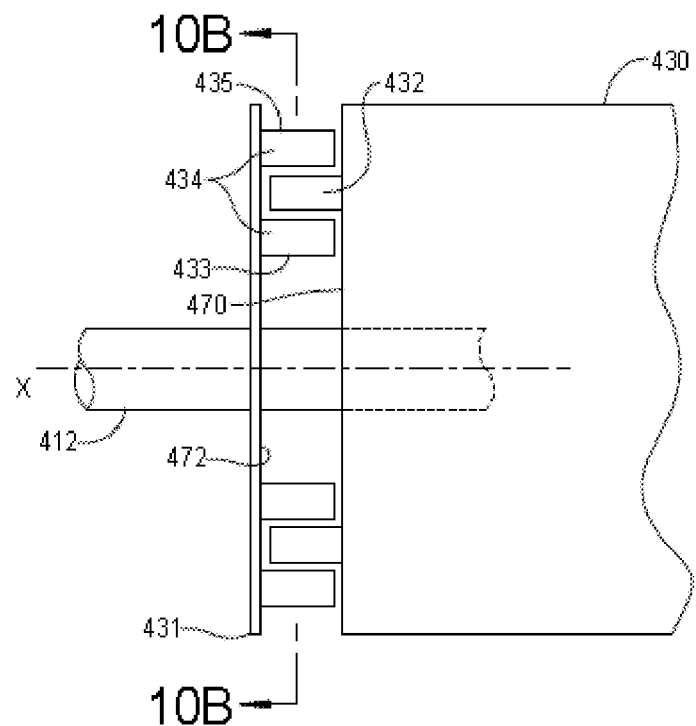
FIG. 10A is a side view of the apparatus of the present disclosure according to additional embodiments.
Figure 10B:
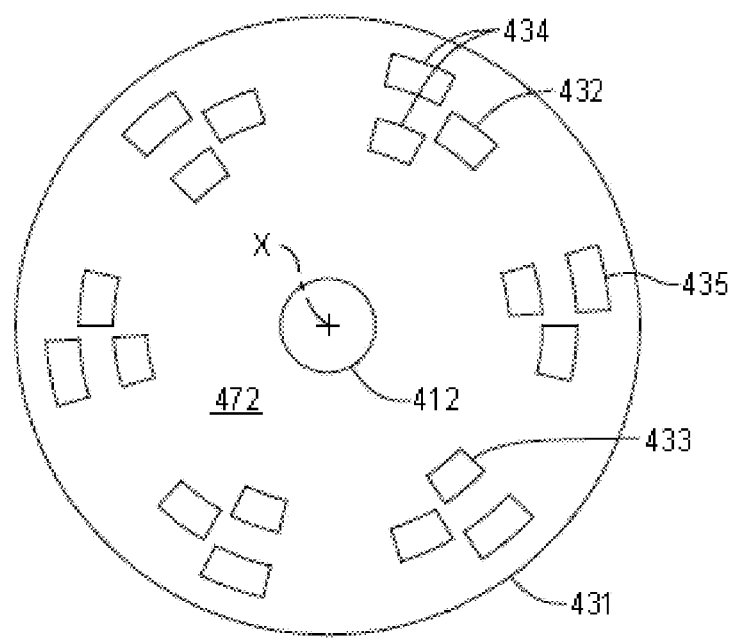
FIG. 10B is a section view of the apparatus taken along the line 10B-10B of FIG. 10A.

Referring now to FIGS. 10A and 10B, additional embodiments of the anti-cogging apparatus 410 will be discussed. Components that correspond to those of the embodiments of FIGS. 1-3 are indicated with corresponding reference numbers increased by 400.

As shown, the apparatus 410 can include a first support member 430 that is tubular and that includes an end face 470. The apparatus 410 can also include a second support member 431 that is flat and disc-shaped so as to include a surface 472 that faces the end face 470 of the first support member 430. The second support member 431 can be coupled (e.g., fixed), directly connected, and/or connected through a gearset or similar speed varying device to the shaft 412 for rotation therewith relative to the first support member 430.

The apparatus 410 can also include a plurality of first magnetic members 432 that are fixed to the end face 470 of the first support member 430. There can be any number of first magnetic members 432, and the first magnetic members 432 can be each disposed at the same radial distance (i.e., a third radial distance) away from the axis X and can be equally spaced away from each other at equal angular distances. For instance, there can be six first magnetic members 432 at every sixty degrees (60°) about the axis X.

Furthermore, the apparatus 410 can include a plurality of second magnetic members 434. The second magnetic members 434 can be arranged in pairs that are aligned along a straight, radial line. Each pair can include an inner magnetic member 433 and an outer magnetic member 435. The inner magnetic members 433 can be annularly arranged about the axis X at a radial distance (i.e., a first radial distance). The outer magnetic members 435 can be annularly arranged about the axis X at a radial distance that is greater than that of the inner magnetic members 433 (i.e., a second radial distance). The radial distance of first magnetic members 432 can be greater than that of the inner magnetic members 433 and less than that of the outer magnetic members 435. Stated differently, the inner magnetic members 433, the first magnetic members 432, and the outer magnetic members 435 can be arranged in concentric circles about the axis with the ring of first magnetic members 432 disposed between the inner and outer magnetic members 433, 435.

As the shaft 412 rotates, the inner and outer magnetic members 433, 435 can rotate relative to the first magnetic members 432. As the first magnetic members 432 move between respective pairs of the inner and outer magnetic members 433, 435, the first magnetic members 432 can magnetically interact (e.g., repel) the inner and outer magnetic members 433, 435 to cause the anti-cogging torque to be imparted to the shaft 412. It will be appreciated that because the first magnetic members 432 move between the inner and outer magnetic members 433, 435, the force of magnetic repulsion can be increased. As a result, anti-cogging torque can be increased (e.g., approximately doubled).

The embodiments of FIGS. 10A and 10B could be varied. For instance, there could be multiple concentric rings of first magnetic members 432, and each ring could be radially arranged to move between respective pairs of rings of inner and outer magnetic members 433, 435. Accordingly, anti-cogging torque can be further increased.

As mentioned above, the anti-cogging apparatus 10, 110, 210, 310, 410 can be operably coupled to an output shaft of an electric motor to offset the cogging that occurs during operation. The apparatus 10, 110, 210, 310, 410 could also be operably coupled to an input shaft of a cam system (FIG. 11) to offset cogging in largely the same fashion. Moreover, the apparatus 10, 110, 210, 310, 410 could be operably coupled to a crankshaft of an internal combustion engine. This can be advantageous, for instance, when combustion is not occurring (e.g., at engine startup, in an engine with certain cylinders that are deactivated, etc.).

Figure 12:
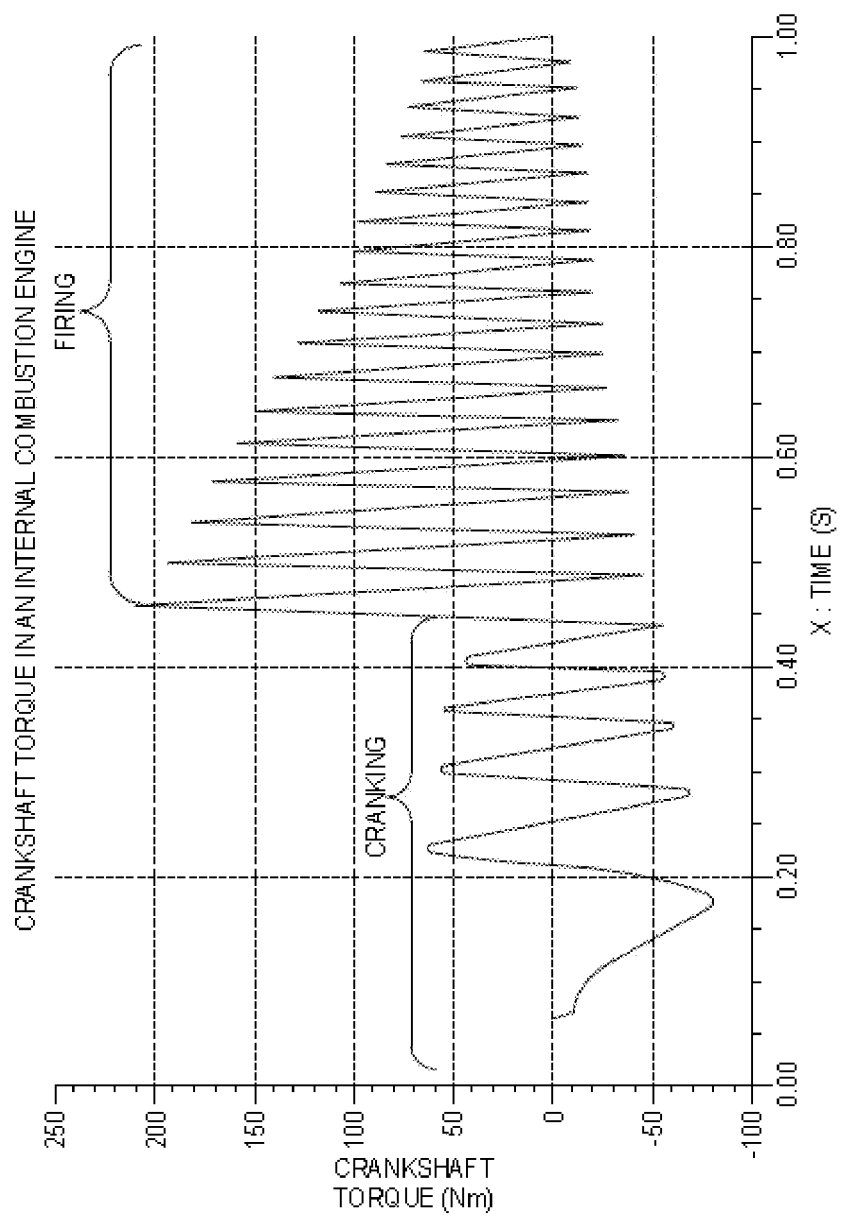
FIG. 12 is a graph representing torque in a crank shaft of an internal combustion engine.
Figure 13:
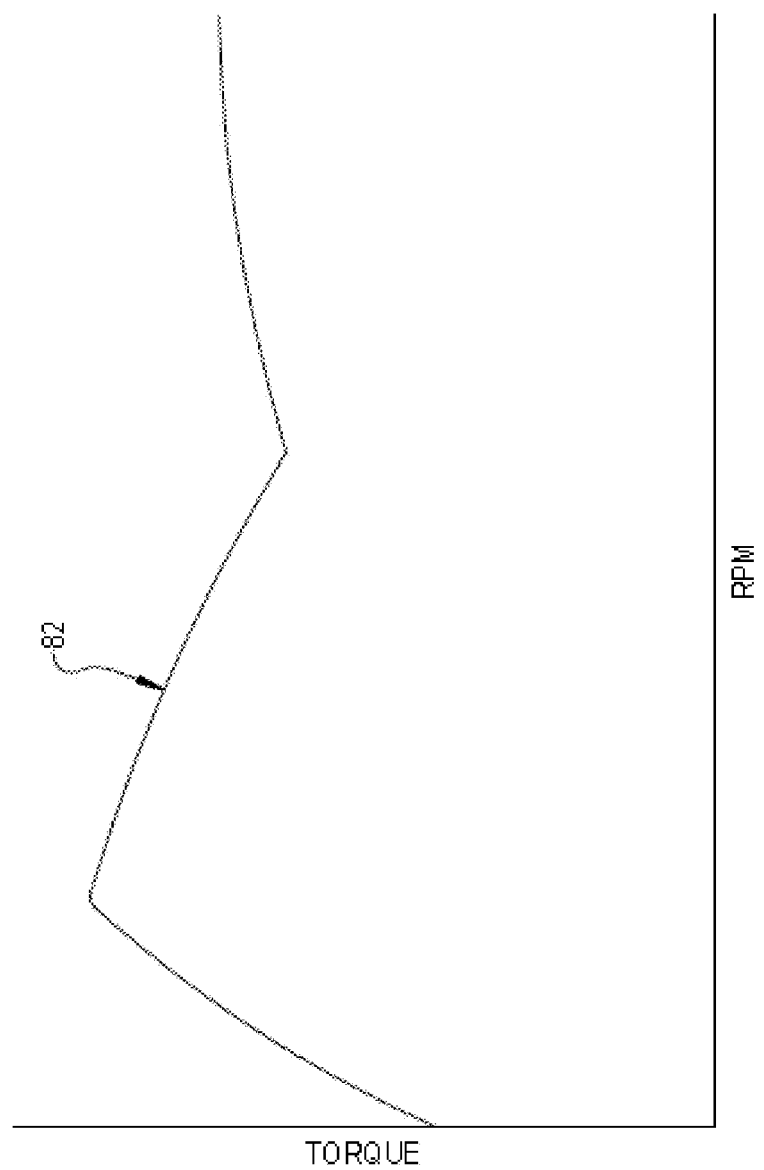
FIG. 13 is a graph representing the maximum cranking torque as a function of engine speed.

FIG. 12 graphically represents the torque on a crankshaft of a known internal combustion engine over time. Also, FIG. 13 includes line 82 that represents the variation of the maximum cranking torque as a function of the engine speed (RPM). As shown in FIG. 12, the torque is cyclical and changes from an initial cranking torque sequence (before combustion occurs in the cylinders) to a firing torque sequence (during combustion) as indicated in FIG. 12. In each of these sequences, there are periods in which the torque is negative. The apparatus 10, 110, 210, 310, 410 could be operably connected to the crankshaft to substantially reduce (e.g., eliminate) these periods of negative torque affecting the crankshaft. As such, the crankshaft would experience less torque resisting rotation, the engine could be operated more efficiently, a smaller starter motor could be used, idle speed can be reduced to reduce fuel usage, etc.

In summary, the anti-cogging apparatus 10, 110, 210, 310, 410 of the present disclosure can offset cogging torques that are imparted on a rotating shaft 12, 112, 212, 312, 412. As such, the apparatus 10, 110, 210, 310, 410 can improve efficiency, can reduce vibration, and otherwise improve rotation of the shaft 12, 112, 212, 312, 412. Also, the apparatus 10, 110, 210, 310, 410 could be incorporated into an existing electric motor, cam system, IC engine, or other existing design to thereby improve efficiency, etc. The apparatus 10, 110, 210, 310, 410 can also be very compact, even when incorporated into existing machines.

Figure 15:
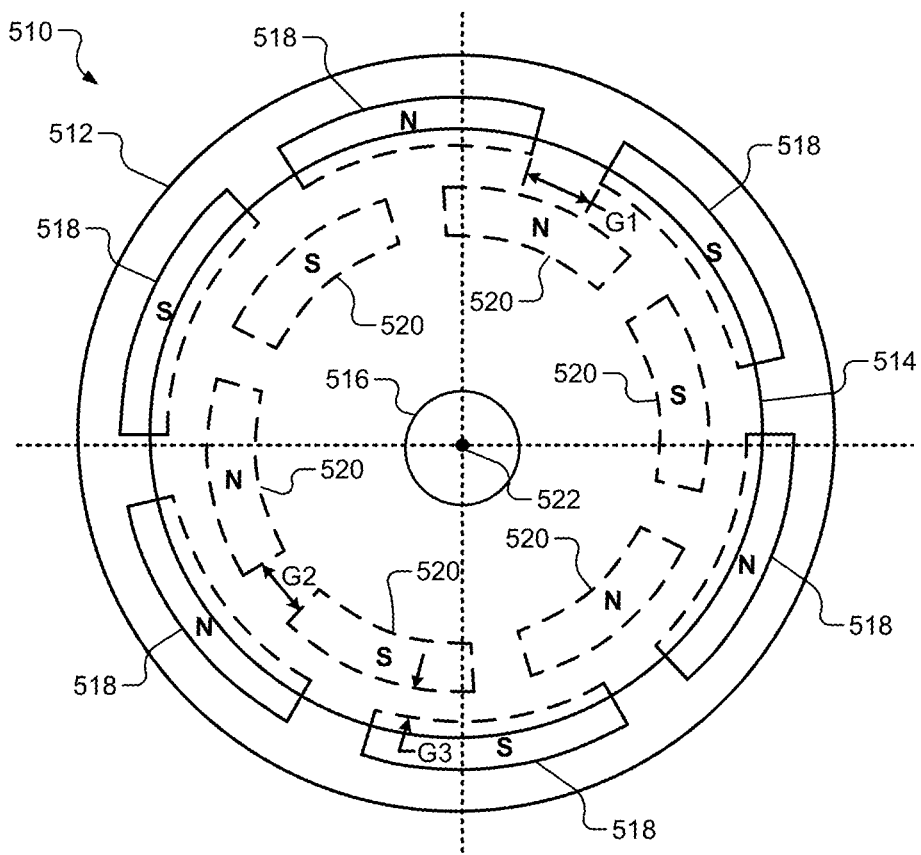
FIG. 15 is an end view of a portion of an anti-cogging apparatus illustrating alternating magnet polarities in accordance with the present disclosure.

FIG. 15 shows an end view of a portion 510 of an anti-cogging apparatus. The portion 510 includes a first support member (or ring) 512 and a second support member (or ring) 514. The first support member 512 may be attached to, in a fixed relationship with, and/or rotate with a shaft 516. The first support member 512 may be axially displaced along the shaft 516. The shaft 516 may be, for example, a crankshaft or camshaft of an engine or other rotatable shaft. The shaft may be on a device other than an engine, for example, on a camshaft of a hydraulic pump.

The first support member 512 may be, for example, a flywheel, a ring connected to the flywheel, or other component connected to the shaft 516. The second support member 514 may be in a fixed (or stationary) position and not rotate with the first support member 512 and/or the shaft 516. The second support member 514 may be connected to and/or integrally formed as part of, for example: an engine block; a transmission bell housing; a component of an engine; a transmission, and/or a torque converter; etc.

A first set of magnets 518 is mounted on the first support member 512. The first set of magnets 518 may be secured to the first support member 512 to withstand speeds of the shaft 516 and expected loads on the first set of magnets 518. The first set of magnets 518 and the second set of magnets 520 may be wedge-shaped as shown or may have a different shape. A second set of magnets 520 are mounted on the second support member 514. The first set of magnets 518 may be rotated (i) about a center axis 522 and in a fixed relationship with the shaft 516, and (ii) within or around the second set of magnets 520, as shown. The first support member 512 and the first set of magnets 518 may be collectively referred to as rotor. The second support member 514 and the second set of magnets 520 may be collectively referred to as a stator. The sets of magnets 518, 520 may deliver a sinusoidal reversing torque to the shaft 516 and provide peak torque magnitudes matching peak reversal torque magnitudes produced during, for example, compression strokes of an engine.

The first set of magnets 518 may have a north pole and a south pole (designated N and S) and may be mounted on the first support member 512 in an alternating polarity configuration as shown. Although shown in an alternating polarity configuration, the first set of magnets may be configured in a non-alternating polarity configuration. As shown, every other magnet in the first set of magnets 518 has a north pole facing the second support member 514 and the other magnets in the first set of magnets 518 has a south pole facing the second support member 514. The north poles and south poles of each of the first set of magnets 518 may either face the first support member 512 or the second support member 514.

Figure 18:
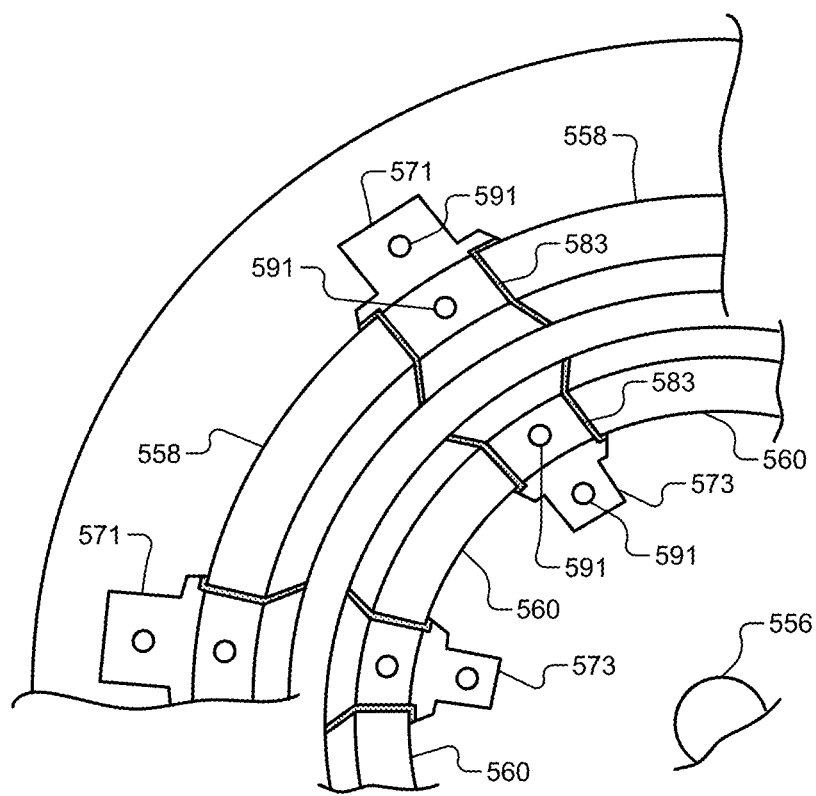
FIG. 18 is a quarter end view of a base plate, magnets and wedges of a displacement system in accordance with the present disclosure.

The second set of magnets 520 may have a north pole and a south pole (also designated N and S) and may be mounted on the second support member 514 in an alternating polarity configuration, as shown. Although shown in an alternating polarity configuration, the second set of magnets may be configured in a non-alternating polarity configuration. The north poles and south poles of each of the second set of magnets 520 may either face the first support member 512 or the second support member 514. The alternating polarity configurations of the sets of magnets 518 and 520 provide an alternating torque. Increased torque is provided due to the alternating polarity configurations and spacing: between adjacent pairs of the first set of magnets (identified as gap G1); between adjacent pairs of the second set of magnets (identified as gap G2); and between the first and second magnets (identified as gap G3). The gaps G1-G3 may be adjusted to provide a determined torque (e.g., anti-cogging torque). The gap G3 (referred to as the radial gap) may be adjusted during operation of the anti-cogging apparatus, as shown in FIG. 18. The gap G3 may be maintained within a predetermined range and/or at a value greater than a predetermined value to maintain a minimum torque and to prevent contact between the sets of magnets 518, 520.

Figure 16:
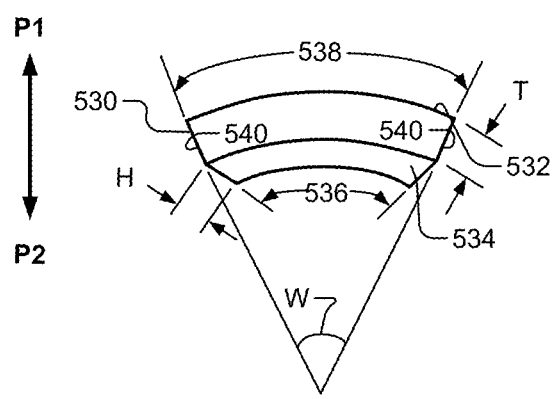
FIG. 16 is a perspective view of a magnet in accordance with the present disclosure.

The sets of magnets 518, 520 have various associated magnet parameters. Each of these parameters may be adjusted during manufacturing of the sets of magnets 518, 520 and/or may be adjusted during operation and/or use of the sets of magnets 518, 520. Some of the magnet parameters are illustrated in FIG. 16. Referring now also to FIG. 16, which shows a perspective view of a magnet 530. The magnet 530 may refer to any one of the magnets in the sets of magnets 518, 520.

The magnet 530 has a semi-circular prism shape with an outer circumferential side 532 and an inner circumferential side 534. An inner circumferential length 536 of the inner circumferential side 534 is less than an outer circumferential length 538 of the outer circumferential side 532. The magnet 530 is polarized and includes a first pole P1 (e.g., north or south pole) and a second pole P2 (e.g., north or south pole). The first pole is on the outer circumferential side 532. The second pole is on the inner circumferential side 534.

The magnet 530 has static parameters including a height H, a width W, a thickness (or depth) T, the inner circumferential length 536, and the outer circumferential length 538. The width W may refer to an angle between lines tangent radial sides 540 of the magnet 530. The lines intersect and form the angle labeled W. As a few examples, the width W may be 5°, 10°, 30° or 45°. For example, in a six-cylinder engine implementation, the width W of the first set of magnets 518 of FIG. 15 may be 45° with gaps (e.g., the first gap G1) between adjacent pairs of the first set of magnets 518 having corresponding angles of 15°. Thus, the sum of the widths of the first sets of magnets 518 and the gaps between the adjacent pairs of the first set of magnets 518 is 360°.

Although in one implementation the static parameters associated with the magnets in the first set of magnets 518 are the same, the static parameters may be different from magnet to magnet. As an example, the thicknesses of all of the magnets in the first set of magnets 518 may be the same or different. This holds true for the magnets in the second set of magnets 520. Thus, the static parameters of the second set of magnets 520 may be the same or different from magnet to magnet. Although certain static parameters (e.g., the width, the thickness, the inner circumferential length, and the outer circumferential length) of the first set of magnets 518 are different than the static parameters of the second set of magnets 520, other static parameters of the first set of magnets 518 may be the same or different than that of the second set of magnets 520. For example, the heights and/or thicknesses of the first set of magnets 518 may be the same or different than the heights and/or thicknesses of the second set of magnets 520.

The static parameters may also include the types, compositions, and/or quantities of materials used to form each magnet. As an example, the magnet 530 may be formed of a N35 grade magnet alloy and/or other suitable materials. The static parameters may also include sizes of gaps between magnets in the first set of magnets 518 and sizes of gaps between magnets in the second set of magnets 520. The static parameters of each magnet in the sets of magnets 518, 520 may be adjusted during manufacturing to provide a predetermined amount of anti-cogging torque and/or predetermined anti-cogging torque profiles.

Figure 17:
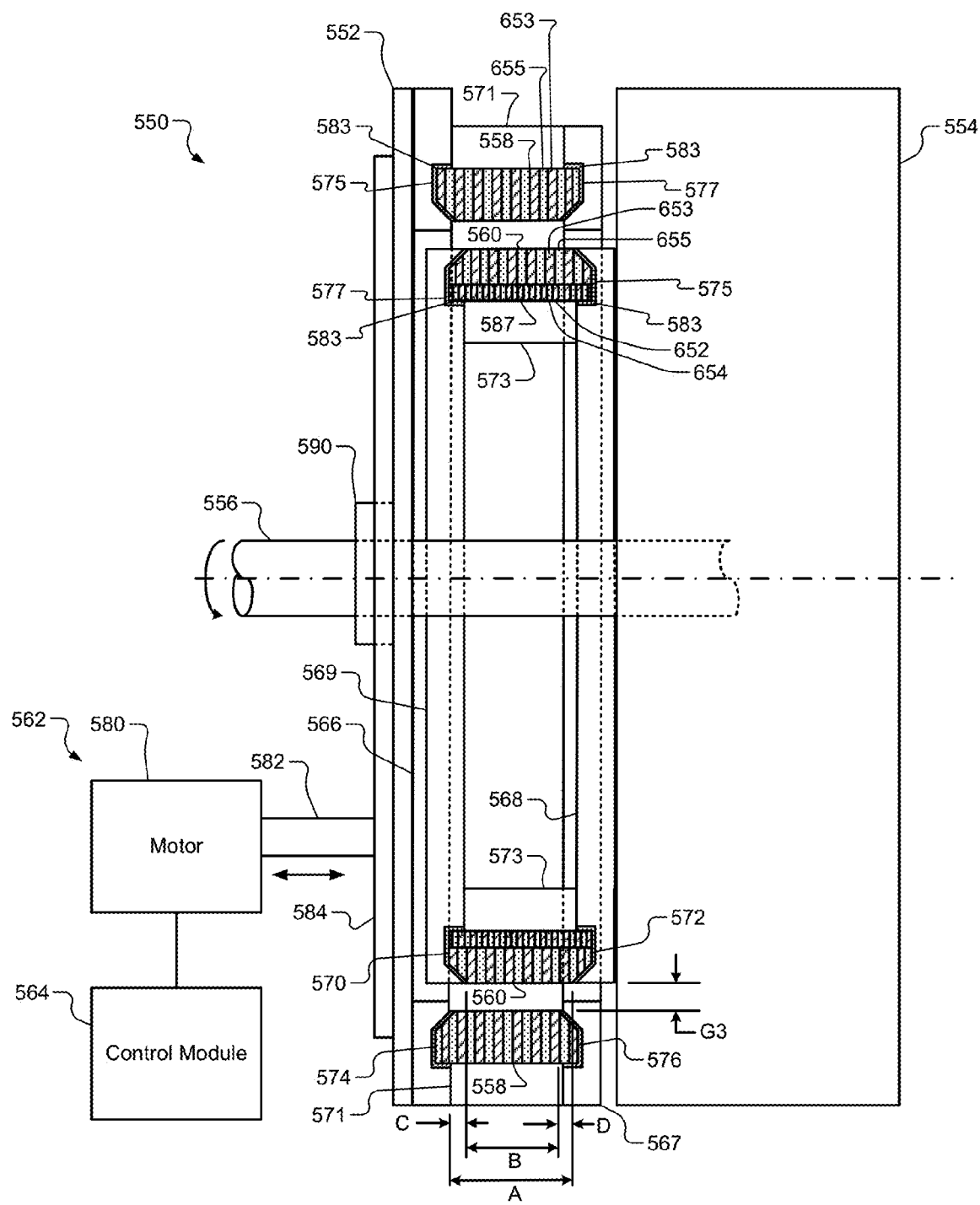
FIG. 17 is a cross-sectional portion of an axial displacement system in accordance with the present disclosure.

The magnet parameters may also include dynamic parameters, such as (i) axial displacement, (ii) radial displacement, and (iii) radial gap between the first set of magnets 518 and the second set of magnets 520. The dynamic parameters may be set initially prior to operation of the anti-cogging apparatus and may be varied during operation of the anti-cogging apparatus. FIG. 17 illustrates dynamic axial movement of the first set of magnets 518. Although axial and radial displacement implementations are shown separately by FIGS. 9 & 17 the axial and radial displacement implementations may be combined into a single implementation.

FIG. 17 shows a cross-sectional portion of an axial displacement system 550 that may include a first support member 552, a second support member 554, a shaft 556, a first set of magnets 558, a second set of magnets 560, a first axial displacement mechanism 562, and a control module 564. The first support member 552 may be in a fixed relationship with the shaft 556 and may rotate with the shaft 556 or may be connected to the shaft 556 via one or more gears. The second support member 554 may be, for example, an engine, a torque converter, a transmission, etc. or a member attached to an engine, a torque converter, a transmission, etc. The second support member 554 may be in a fixed position. Although FIG. 17, for illustration purposes only a certain number of magnets, additional magnets may also be included in the sets of magnets 558, 560 similar to the arrangements shown in FIGS. 15 and 18. The magnets 558, 560 may be arranged in respective positions around the shaft 556 and on the base plates 566, 568.

A first base plate (or supporting ring) 566 may be attached to the first support member 552. The first set of magnets 558 may be attached to the first support member 552 and/or the first base plate 566. In one implementation, the first support member 552 and the first base plate 566 are formed as a single plate. A second base plate 568 may be attached to the second support member 554. In one implementation, the second support member 554 and the second base plate 568 are formed as a single plate. The second set of magnets 560 may be attached to the second support member 554 and/or the second base plate 568. In one implementation, the base plates 566, 568 are not included. In another implementation, the first base plate 566 is included and the second backing plate 568 is not included. In a third implementation, the second base plate 568 is included and the first base plate 566 is not included.

Referring now also to FIG. 18, a portion of the base plates 566, 568, the magnets 558, 560 and wedges 571, 573 are shown. FIG. 18 Illustrates an end view of portions of a first set of magnets and a second set of magnets and corresponding attachments. The magnets 558, 560 may be held between (i) the respective support members 552, 554 and/or the base plates 566, 568, and (ii) retaining rings 567, 569. The magnets 558, 560 may be held to the respective support members 552, 554 and/or the base plates 566, 568 and between the base plates 566, 568 and the retaining rings 567, 569 via wedges 571, 573 (further shown in FIG. 19) and respective fasteners (not shown). The fasteners may, for example, extend in and/or through holes 591 in the support members 552, 554, the base plates 566, 568, the retaining rings 567, 569 and/or the wedges 571, 573. The fasteners may be used to attach the wedges 571, 573 and/or the retaining rings 567, 569 to the support members 552, 554 and/or the base plates 566, 568.

The magnets 558, 560 may be shaped to be held in respective recessed areas (or grooves) 575, 577 of the base plates 566, 568 and retaining rings and in respective recessed areas (or grooves) 579, 581 of the wedges 571, 573. Gaskets and/or adhesive (designated 583) may be used between (i) the magnets 558, 560, and (ii) the base plates 566, 568 and/or the wedges 571, 573.

Backing plates 587 may be attached to and/or held onto backsides of the magnets 558. 560. The backing plates (e.g., backing plates 587) may be held, similar to the magnets 558, 560, between the backing plates 566, 568 and the retaining rings 567, 569. Although backing plates are shown as being used with respect to magnets 560, backing plates may also be used with respect to the magnets 558. In one implementation, backing plates are used on the magnets 560 and not on the magnets 558.

The backing plates aid in increasing forces exerted between the first set of magnets 558 and the second set of magnets 560, thereby increasing anti-cogging forces. The backing plates may include one or more magnetically conductive layers 652, which may be laminated by one or more insulation layers 654. The layers 652, 654 may be stacked. The magnetically conductive layers 652 may be formed of materials that conduct magnetic flux, such as ferromagnetic materials (e.g., iron and steel). The insulation layers 654 are non-conductive layers and may each be interdisposed between two of the magnetically conductive layers 652. The insulation layers 654 minimize and/or prevent eddy currents in the backing plates. In one implementation, the top and bottom or outer most layers of the backing plates are magnetically conductive layers 652. In this implementation, base plates (e.g., base plates 566, 568), retaining rings (e.g., retaining rings 567, 569), and/or gaskets (e.g., gaskets 583) may be in contact with the outer most layers (or two of the magnetically conductive layers 652) of the backing plates. The magnets 558 and 560 may also be formed of multiple stacked layers. The layers may include magnetically conductive layers 653 and insulation layers 655. The layers 653, 655 may be stacked axially and may extend radially.

Characteristics of the magnets and backing plates may be set to provide certain amounts of anti-cogging torque. The characteristics may include compositions and thicknesses of each of the magnetically conductive layers and insulation layers. The characteristics may also include dimensions of the magnets and backing plates including a radial and axial thicknesses of the magnets and backing plates. The characteristics may further include: a total number of magnets and backing plates in an anti-cogging apparatus; a number of backing plates on which a first set of magnets of the anti-cogging apparatus are attached; a number of backing plates on which a second set of magnets of the anti-cogging apparatus are attached; etc.

Referring now also to FIGS. 19A-19B, side and perspective views of an example wedge 593 is shown. The wedge 593 may be a single element and may include a magnet retaining portion 594 and a coupling portion 595. The magnet retaining portion 594 may be shaped such that ends 596 of the magnet retaining portion 594 hold or lock in place magnets (e.g., the magnets 560). The wedge 593 is an example of one of the inner wedges 573. The outer wedges 571 may be shaped differently than the inner wedges 573, as shown in FIG. 18. The coupling portion 595 has a hole 597 for attaching the wedge 593 to a base plate via a fastener.

Referring now also to FIG. 20, side and end views of an example retaining ring 598 is shown. The retaining ring 598 may replace one of the retaining rings 567, 569 of FIG. 17. The retaining ring 598 may include holes 599 for attaching the retaining ring 598 to a base plate via respective fasteners. The retaining ring 598 may have a groove 601 in which magnets and wedges may be held. The retaining ring 598 also include a center opening 603 in which a stator or a rotor may rotate.

Referring again to FIG. 17, the first support member 552, the first set of magnets 558, the first base plate 566, and the first retaining ring 567 may be collectively referred to as one of a rotor or a stator. The second support member 554, the second set of magnets 560, the second base plate 568, and the second retaining ring 569 may be collectively referred to as the other one of the rotor or the stator. The first set of magnets 558 overlap the second set of magnets 560 along the shaft 556. The first set of magnets 558 have first sides including first attachment sides (one of the first attachment sides is designated 570) and second attachment sides (one of the second attachment sides is designated 572). The first attachment sides are attached to the first base plate 566 and/or the first support member 552. The second attachment sides are opposite the first attachment sides and are attached to the first retaining ring 567. The second set of magnets 560 have second sides including third attachment sides (one of the third attachment sides is designated 574) and fourth attachment sides (one of the fourth attachment sides is designated 576). The third attachment sides are attached to the second base plate 568 and/or second support member 554. The fourth attachment sides are opposite the third attachment sides.

The first set of magnets 558 and/or the second set of magnets 560 may be axially displaced to change distances (labeled A, B, C and D) between the first and second sides (e.g., sides 570-576). Distance A is an axial distance between the first and third attachment sides (e.g., attachment sides 570, 574). Distance B is an axial distance between the second and fourth attachment sides (e.g., attachment sides 572, 576). Distance C is a distance between the first attachment side (e.g., attachment side 570) and the fourth attachment side (e.g., opposing side 576). Distance D is a distance between the second attachment side (e.g., opposing side 572) and the third attachment side (e.g., attachment side 574). The gap G3 exists between the first set of magnets 558 and the second set of magnets 560. The radial gap G3 may be adjusted, as shown in FIG. 21. The distance A may be adjusted to be within a first predetermined range and/or greater than a first predetermined distance. The distance B may be adjusted to be within a second predetermined range and/or less than a second predetermined distance. The distance C and the distance D may each be adjusted to be within a third predetermined range and/or greater than a third predetermined distance.

The first axial displacement mechanism 562 is provided for example purposes only. The first axial displacement mechanism 562 may include a motor 580 and a screw 582 (or an actuator and/or other components). The motor 580 may turn the screw 582 to move the first support member 552, the first base plate 566, the first retaining ring 567 and the first set of magnets 558 axially and relative to the second set of magnets 560, the second base plate 568 and the second support member 554. The motor 580 and/or screw 582 may not rotate with the shaft 556 and/or the first support member 552. The screw 582 may engage with the first support member via a coupling device 584, which allows the first support member 552 to move relative to the screw 582. Although the first support member 552, the first base plate 566, the first retaining ring 567 and the first set of magnets 558 are shown as being moved axially, the second set of magnets 560, the second base plate 568, the second retaining ring 569 and the second support member 554 may also and/or alternatively be moved axially. A second axial displacement mechanism may be provided to move the second set of magnets 560, the second base plate 568, the second retaining ring 569 and the second support member 554 axially.

Although the first axial displacement mechanism 562 is shown as including a motor and a screw, the axial displacement mechanisms may include motors, actuators, screws, levers, hydraulic components, pneumatic components, electrical components, and/or other suitable components to move the sets of magnets, base plates, retaining rings, and support members axially. The sets of magnets 558, 560, base plates 566, 568, retaining rings 567, 569 and support members 552, 554 may be moved axially using electrical, pneumatic, hydraulic, and/or centrifugal forces and/or control.

The axial displacement mechanisms may be controlled by the control module 564. The control module 564 may control the axial displacement of the sets of magnets 558, 560, base plates 566, 568, the retaining rings 567, 569 and support members 552, 554 based on the magnet parameters including the static and the dynamic parameters and based on engine parameters. The engine parameters may include, for example, engine speed, throttle position, valve positions, engine load, and/or other engine parameters that affect (i) an amount of air received by an engine, and/or (ii) impedance of an exhaust of the engine. The engine parameters may include any engine parameters that affect a cogging torque the engine delivers to a crankshaft.

For example only, the first support member 552 may be held in a fixed relationship with, engage with, and/or slide along the shaft 556. A locking mechanism 590 may be incorporated to engage with the shaft. The locking mechanism may include, for example: bearings; teeth for engaging in one or more grooves or slots in the shaft 556 and/or a component attached to the shaft, clutch or pressure plates or pads for engaging with the shaft 556 and/or a component attached to the shaft, etc. The locking mechanism may also include a gearset to provide for differing rotational speeds between the shaft 556 and the first support member 552.

FIG. 21 shows a radial displacement system 600 that includes a first support member 602, a second support member 604, a shaft 606, a first set of magnets 608, a second set of magnets 610, first radial displacement mechanisms 612, and a control module 614.

The first support member 602 may be in a fixed relationship with the shaft 606, rotate with the shaft 606, and/or be axially displaced on the shaft 606. The second support member 604 may be in a fixed position with respect to the engine or device to which an anti-cogging torque is being applied. Although the diameters of the first and second support members 602, 604 can be of any size, in the example shown, a diameter of the first support member 602 is smaller than a diameter of the second support member 604. This is different than the example of FIG. 17.

The first set of magnets 608 and/or the second set of magnets 610 may replace and/or be configured similar to the first set of magnets 558 and/or the second set of magnets 560 of FIG. 15. The first support member 602 may be configured to hold the first radial displacement mechanisms 612 and/or a portion thereof.

The first radial displacement mechanisms 612 may include, for example, motors 620 and screws 622 (or actuators and/or other components) to radially displace the second set of magnets 610 towards and/or away from the first set of magnets 608, as shown. The motors 620 may turn the screws 622 to move the second set of magnets 610 radially and relative to the first set of magnets 608. Although the second set of magnets 610 are shown as being moved radially, the first set of magnets 608 may also and/or alternatively be moved radially. Second radial displacement mechanisms may be provided to the move the first set of magnets 608 radially towards and/or away from the second set of magnets 610.

The radial displacement mechanisms may include motors, actuators, screws, levers, hydraulic components, pneumatic components, electrical components, and/or other suitable components to move the sets of magnets 608, 610, radially. The sets of magnets 608, 610 may be moved axially using electrical, pneumatic, hydraulic, and/or centrifugal forces and/or control.

The radial displacement mechanisms may be controlled by the control module 614. The control module 614 may control the radial displacement of the sets of magnets 608, 610 based on the magnet parameters including the static and the dynamic magnet parameters, the backing plate parameters, and the engine parameters. The radial displacement may be controlled to adjust the radial gap G3 between the first set of magnets 608 and the second set of magnets 610. Adjustment of the radial gap G3 can provide a more linear change in anti-cogging torque than a change in radial positioning of the first and/or second sets of magnets 608, 610.

FIG. 22 shows an anti-cogging control system 670 that includes a control module 672, sensors 674, and magnet actuators 676. The control module 672 may replace the control modules 564, 614 of FIGS. 17 and 21. Although the control module 672 is primarily described with respect to an engine, the control module 672 may be applied to other power and/or torque producing devices, such as motors, pumps, etc. The control module 672 includes an engine parameter module 678, a magnet parameter module 680, a backing plate module 682, a memory 684, and a magnet adjustment module 686.

The engine parameter module 678 determines and stores static and dynamic engine parameters 688. The static (or non-varying) engine parameters may include, for example, number of cylinders, number of cogging events (or torque reversals) per revolution of a crankshaft and/or per an engine cycle, number of compression strokes per revolution of a crankshaft and/or per engine cycle, etc. The dynamic engine parameters may include, engine temperature, engine speed, engine load, engine output torque, etc. Predetermined engine output torques may be stored as an engine torque profile 690, which may be based on the static and/or dynamic engine parameters. The dynamic engine parameters may be determined based on signals from the sensors 674. The sensors 674 may include an engine temperature sensor, an engine speed sensor, an engine load sensor, an engine torque sensor, etc. The control module 672 controls the magnet actuators 676 based on signals from the sensors 674 and parameters and characteristics stored in the memory 684.

The magnet parameter module 680 determines and stores magnet parameters 692 including the static and dynamic magnet parameters, such as those described herein, in the memory 684. The backing plate module 682 determines and stores backing plate characteristics 694, such as those described herein, in the memory 684.

The magnet adjustment module 686 includes an axial displacement module 690 and a radial displacement module 692 for determining respectively axial positions and radial positions of magnets in, for example, a first set of magnets (e.g., one of the first set of magnets 518, 558, 608 of FIGS. 15, 17, 21) and a second set of magnets (e.g., one of the second set of magnets 520, 560, 610 of FIGS. 15, 17, 21). The axial and radial displacement modules 690, 692 may store axial and radial positions and/or profiles 696 of the magnets in the memory 684. The axial and radial position and/or profiles 696 may be based on the engine parameters 688 and provide axial and radial positions relative to one or more of the engine parameters 688. The axial and radial positions and/or profiles 696 may also be based on the engine torque profiles 690. The axial and radial positions and/or profiles 696 may be predetermined, adjusted during operation of a corresponding engine, and/or set to satisfy anti-cogging torque profiles 698. The anti-cogging torque profiles 698 may be stored in the memory 684. The anti-cogging torque profiles 698 may mirror the engine torque profiles 690 in order to counteract and/or cancel, for example, negative (or reversal) torques of the engine.

The relationships between engine parameters and/or profiles 688, 690, magnet parameters 692, backing plate characteristics 694, anti-cogging torque profiles 698, etc. may be stored as tables in the memory 684. The control modules disclosed herein may access the tables from the memory 684 and adjust positions of magnets to adjust torque provided by the magnets, as further described below.

FIG. 23 illustrates a method of manufacturing an anti-cogging apparatus and/or system (e.g., the apparatus 500 or one of the systems 550, 600). Although the following tasks are primarily described with respect to the implementations of FIGS. 15-21, the tasks may be easily modified to apply to other implementations of the present disclosure. The tasks may be iteratively performed. The following tasks may be performed, for example, by a design computer and/or control module and may be performed for a certain application. Although the tasks are primarily described with respect to an engine application, the tasks may be modified to apply to other power and/or torque producing devices, such as motors, pumps, etc.

The method may begin at 700. At 702, engine parameters of an engine are determined. The engine parameters may include static and/or predetermined dynamic parameters and/or profiles, as described above. The engine parameters and/or engine torque profiles may be determined based on models of the engine, predetermined and stored parameters of the engine, parameters collected during operation of the engine, etc.

At 704, if one or more backing plates are to be included, backing plate characteristics, such as those described above, may be determined. A determination of whether one or more backing plates are to be included may be based on the magnet parameters and the engine parameters.

At 706, the magnet parameters may be determined based on the engine parameters, predetermined engine torque profiles, predetermined engine output torque during cogging events, backing plate characteristics, etc. Although task 704 is shown as being performed prior to task 706, task 704 may be performed prior to or while performing task 706. For example, the backing plate characteristics may be determined based on the magnet parameters.

At 708, axial and/or radial positions and/or profiles may be determined based on the engine parameters, engine torque profiles, backing plate characteristics, and magnet parameters. Task 708 may be performed prior to and/or while performing one or more of tasks 702-706.

At 710, the anti-cogging apparatus and/or system may be manufactured based on the engine parameters, engine torque profiles, backing plate characteristics, magnet parameters, and/or axial and/or radial positions and/or profiles. Task 702 may be performed subsequent to task 710.

FIG. 24 illustrates a method of operating an anti-cogging apparatus and/or system (e.g., the apparatus 500 or one of the systems 550, 600). The following tasks may be performed by a control module (e.g., one of the control modules 564, 614, 672 of FIGS. 17, 21 and 22) and may be performed for a certain application. Although the tasks are primarily described with respect to an engine application, the tasks may be modified to apply to other power and/or torque producing devices, such as motors, pumps, etc. The method may begin at 720.

At 722, an engine parameter module (e.g., the engine parameter module 678) may determine engine parameters and/or profiles (e.g., engine parameters and profiles 688, 690) of an engine.

At 724, a backing plate module (e.g., the backing plate module 682) may determine whether backing plates are incorporated in the anti-cogging apparatus and/or determine backing plate characteristics (e.g., backing plate characteristics 694).

At 726, the magnet parameter module (e.g., the magnet parameter module 680) determines static and dynamic magnet parameters (e.g., magnet parameters 692) and/or profiles (e.g., anti-cogging torque profiles 698) based on the engine parameters and/or profiles.

At 728, the magnet adjustment module (e.g., the magnet adjustment module 686) adjusts position of magnets based on the engine parameters and/or profiles, backing plate characteristics, and/or magnet parameters and/or profiles. The positions of the magnets may be adjusted by signals one or more motors and/or actuators (e.g., one or more of the motors and/or actuators 580, 620). This may include determining axial and/or radial positions of one or more magnets, positions of one or more support members (e.g., one or more of the support members 512, 514, 552, 554, 602, 604) of the magnets, and/or positions of one or more backing plates (e.g., one or more of the backing plates 566, 568, 602, 604). The adjustments may be made to reduce and/or cancel reversal torque associated with a cogging event of the engine. Task 722 may be performed subsequent to task 728.

The implementations disclosed herein are applicable to both 2-stroke and 4-stroke engines. As an example, twice as many magnets may be used to apply an anti-cogging torque to a shaft of a 2-stroke engine as used to apply an anti-cogging torque to a shaft of a 4-stroke engine.

FIG. 25 is a diagram of an anti-cogging system 798 illustrating an end view of a differential speed assembly 800 for an anti-cogging apparatus (or cam follower) 802. In the example shown, the differential speed assembly 800 includes a gear set 804 with multiple gears including a shaft gear 808, a differential gear 810 and a cam gear (or other camming member) 812. The differential speed assembly 800 may include components other than the stated gears to provide a speed difference between (i) a shaft 814 (e.g., a crankshaft) and (ii) the cam gear 812 and/or a cam surface 816 of the cam gear 812. The cam surface 816 has lobes extending radially relative to an axis-of-rotation of the shaft 814. The cam gear 812 includes inner teeth 818 that engage with teeth 820 of the differential gear 810. The teeth 820 engage with teeth 821 of the shaft 814. Although a certain number of gears are shown, any number of gears may be included in the differential speed assembly 800.

The anti-cogging apparatus 802 includes one or more springs (or other biasing members) 822, which are held between a supporting member 824 and a seat (or retainer) 826. A rod 828 may extend in the springs 822 and the seat 826 between the support member 824 and an abutment member (or roller) 830. The abutment member 830 rides on the cam surface 816 and provides an anti-cogging torque as described above. In one implementation, the abutment member 802 is in a fixed position relative to the shaft 814. The shaft 814 rotates in the cam gear 812. Although the abutment member 830 is shown as being moved in a radial direction relative to the shaft 814, the abutment member may be configured to move in an axial direction relative to the shaft 814.

Also, although a single anti-cogging apparatus and a single abutment member are shown with respect to implementations of certain figures, any number of anti-cogging apparatuses and/or abutment members may be utilized in any of the implementations of the figures. Furthermore, when multiple abutment member are used, the abutment members may sequentially abut against the same lobe or a plurality of lobes of a cam surface (e.g., any of the cam surfaces disclosed herein).

The differential speed assembly 800 may be utilized with any of the anti-cogging apparatuses disclosed herein. The differential speed assembly 800 may be used in an engine with any number of cylinders. In one embodiment, the differential speed assembly 800 is used in an engine with an odd number of cylinders. The differential speed assembly 800 allows the cam gear 812 to rotate at a different speed than the shaft 814.

Tension on the one or more springs 822 may be controlled by a control module 832 using one or more actuators (actuator 834 is shown). The control module 832 may adjust an amount of tension or compression of the one or more springs 822, for example, by adjusting a preloaded or default state of the springs 822 and/or position of the seat 826 relative to the support member 824. The control module 832 may instruct the actuator 834 to adjust a position and/or an amount of force on the seat 826, via pre-load elements 827 and a loading retainer 829, which adjusts an amount of tension or compression on the springs 822. The control module 832 may adjust tension, compression and/or load on the springs 822 based on a speed of the shaft 814, a speed of the differential gear, and/or a speed of the cam gear 812. The actuator 834 may include, for example, a motor, a solenoid, or other actuator suitable for adjusting load on the springs 822 and thus an amount of anti-cogging torque. The preload elements 827 may include springs, rods, elastic elements, dampening elements, and/or other suitable elements.

The number and arrangement of abutment members on anti-cogging members (e.g., the cam gear 812), in conjunction with the differential speed assembly 800), are such that anti-cogging inputs applied to the shaft 814 correspond to cogging inputs applied to the shaft 814.

FIG. 26 is an end view illustrating a differential speed assembly 850 for another anti-cogging apparatus 852. In the example shown, the differential speed assembly 850 includes a gear set 854 with multiple gears including a shaft gear 858, a differential gear 860 and a support member 862, which performs as another gear. The differential speed assembly 800 may include components other than the stated gears to provide a speed difference between a shaft 864 (e.g., a crankshaft) and the support member 862. The support member 862 includes inner teeth 868 that engage with teeth 870 of the differential gear 860. The teeth 870 engage with teeth 872 of the shaft 864. Although a certain number of gears are shown, any number of gears may be included in the differential speed assembly 850.

The anti-cogging apparatus 852 includes a first set of magnets 874 and a second set of magnets 876. The first set of magnets 874 is mounted on the support member 862. The second set of magnets 876 are mounted on a second support member 878. The first set of magnets 874 and the second set of magnets 876 provide an anti-cogging torque as described above. In one implementation, the second set of magnets 876 are in a fixed position such that the shaft 864 rotates in the second set of magnets 876. The first set of magnets 874 may be rotated around the shaft 864.

The differential speed assembly 850 may be utilized with any of the anti-cogging apparatuses disclosed herein. The differential speed assembly 850 may be used in an engine with any number of cylinders. In one embodiment, the differential speed assembly 850 is used in an engine with an odd number of cylinders. The differential speed assembly 850 allows the support member 862 to rotate at a different speed than the shaft 864. The support member 862 may be, for example, a rotor of an electrical motor.

A control module (e.g., control module 564 or control module 614) and/or actuators may be included as described above to control positions of the first set of magnets and/or positions of the second set of magnets. Movement of the second set of magnets relative to the first set of magnets adjusts an amount of anti-cogging torque applied. This may be based on various parameters as described above including, for example, a speed of the shaft 864.

FIGS. 27A and 27B are functional block diagrams of an anti-cogging system 898 illustrating states of a centrifugal anti-cogging apparatus (or cam follower) 900. FIG. 27A shows the centrifugal anti-cogging apparatus 900 in an extended state. FIG. 27B shows the centrifugal anti-cogging apparatus 900 in a compressed state.

The centrifugal anti-cogging apparatus 900 includes a spring 902 (or other biasing member) that is held between a support member 904 and a seat (or retainer) 906. A rod 908 extends through the support member 904, the spring 902 and the seat 906. A first end 910 of the rod 908 connects to an object 912. The object 912 may be connected to the abutment member 916 via the rod 908 and/or other suitable coupling devices. The coupling devices connecting the object 912 to the abutment member 916 are configured to adjust the amount of anti-cogging torque based on centrifugal forces associated with rotation of the object. A second end 914 of the rod 908 connects to an abutment member 916. The object 912 has a predetermined amount of mass and is included to provide centrifugal force.

The support member 904 may be moved radially and/or relative to a cam surface (e.g., the cam surface 818 as shown) via an actuator 920, which may be controlled by a control module 922 to adjust an amount of preload on the spring 902. The actuator 920 may be connected to the support member 904 via a screw 923.

In one implementation, the cam surface and/or corresponding camming device is connected and is in a fixed relationship with the shaft 818. The support member 904 is not connected to the shaft and/or does not rotate. In another implementation, the cam surface and/or corresponding camming device is coupled to the shaft 818 via a differential speed assembly (e.g., the differential speed assembly of FIG. 25). In yet another implementation, the cam surface and/or corresponding camming device is not connected to the shaft 814 and/or does not rotate. The support member 904 is connected and is in a fixed relationship with the shaft (e.g., the shaft 814 is shown). The support member 904 may rotate in a same direction as the shaft 814, which is in an opposite direction as the cam surface 818. The support member 904 may be connected to the shaft 904 by a differential speed assembly (e.g., the differential speed assembly in FIG. 25).

The amount of centrifugal force associated with the object 912 on the rod 908 changes with speed of the shaft 814. As the speed of the shaft 814 increases the amount of centrifugal force increases, which increases load on the spring 902.

FIG. 28 is a side view of another centrifugal anti-cogging apparatus 950. The centrifugal anti-cogging apparatus 950 includes a first support member 952 with a first set of magnets 954 and a second support member 956 with a second set of magnets 958. The first support member 952 may be stationary and thus not rotate with a shaft 960 (e.g., a crankshaft). The second support member 956 is free to slide axially on the shaft 960 and is connected to the shaft 960 via a dual-scissor arm assembly 962.

The dual-scissor arm assembly 962 includes two pairs of scissor arms. Each pair of the scissor arms includes two arms 964, 966. A first end 968 of the first arm 964 is connected to an object 970 and a second end 972 of the first arm 964 is connected to an abutment member 974. The object 970 has a predetermined amount of mass and is included to provide centrifugal force. A first end 976 of the second arm 966 is connected to the first leg 964 via a hinge 978. A second end 980 of the second arm 966 is connected to a coupling 982. The coupling 982 is connected and is in a fixed position relative to the shaft 960. The abutment members 974 are held between the second support member 956 and a plate 984. A spring 986 is held between the coupling 982 and the plate 984. The plate 984 is free to slide axially on the shaft 960.

A spacer 987 may be included between the plate 984 and the second support member 956. The spacer 987 may slide on the shaft 960 and hold the plate 984 in a fixed position relative to the second support member 956.

In operation, as the speed of the shaft 960 increases, the amount of centrifugal force associated with the objects 970 increases, forcing the objects 970 outward away from the shaft 960, thereby moving the abutment members 974 inward towards the shaft 960. The inward movement of the abutment members 974 causes the plate 984 and the second support member 956 to move towards the coupling 982. This increases load on the spring 986. The movement of the second support member 956 changes the positions of the second set of magnets 958 relative to the first set of magnets 954. The second set of magnets 958 are moved in an axial direction relative to the first set of magnets 954.

FIG. 29 shows an anti-cogging system 998 illustrating a side view of an anti-cogging apparatus (or cam follower) 1000. The anti-cogging apparatus includes a cam surface 1002 of a camming device 1003 with lobes 1004 extending in an axial direction. The anti-cogging apparatus 1000 includes a rod 1006 that extends through a support member 1008, a spring 1010 and a seat (or retainer) 1012 and from at least the support member 1008 to an abutment member 1014. The abutment member 1014 applies an anti-cogging torque on the cam surface 1002. The cam surface 1002 rotates about an axis-of-rotation 1016 of a shaft 1018. The camming device 1003 is connected to the shaft 1018, which is coupled to a device housing 1020 (e.g., an engine block, a clutch housing, a transmission housing, or other housing). The support member 1008 may not rotate with the shaft 1018.

Although the camming device 1003 is shown as being coupled to and rotating with the shaft 1018, the camming device 1003 may not rotate with the shaft 1018 and the support member 1008 may alternatively be coupled to and rotate with the shaft 1018. In one implementation, a differential speed assembly couples the camming device 1003 to the shaft 1018. In another implementation, a differential speed assembly couples the support member 1008 to the shaft 1018. An example of a differential speed assembly that may be used for these implementations is shown in FIG. 25.

The anti-cogging apparatus 1000 may also include an actuator 1022 and a control module 1024. The control module 1024 may adjust the anti-cogging torque by adjusting a position of the support member 1008 via the actuator 1022 and relative to the cam surface 1002. This adjusts (i) an amount of load on the spring 1010, and (ii) an amount of force applied by the abutment member 1014 on the cam surface 1002.

The implementations disclosed herein may be utilized separately or in combination this includes combining mechanically based implementation with magnetically based implementations. For example, the implementations of FIGS. 1-4, 25, 27A, 27B, and 28-29 may be used in combination with the implementations of FIGS. 5-7, 9, 10A, 10B, 15-22 and 26.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

Although the terms first, second, third, etc. may be used herein to describe various components, magnets, backing plates, support members and/or elements, these items should not be limited by these terms. These terms may be only used to distinguish one item from another item. Terms such as "first," "second," and other numerical terms when used herein do not imply a sequence or order unless clearly indicated by the context. Thus, a first item discussed below could be termed a second item without departing from the teachings of the example implementations.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. An apparatus that improves rotation of a rotatable shaft, wherein the rotatable shaft has a cyclical cogging torque acting thereon in a first direction, the apparatus comprising:
   a support member that is adjacent the rotatable shaft, the rotatable shaft operable to rotate relative to the support member;
   a first anti-cogging member coupled to the support member;
   a second anti-cogging member that is coupled directly or indirectly to the rotatable shaft to rotate based on rotation of the shaft;
   a cam surface having at least one lobe that is included on one of the first and second anti-cogging members;
   at least one abutment member that is coupled to the other of the first and second anti-cogging members, wherein the at least one abutment member is operable to abut against the cam surface to provide an anti-cogging torque to the rotatable shaft in a second direction that opposes the first direction to at least partially offset the cogging torque; and
   at least one biasing member that biases the at least one abutment member toward the cam surface,
   wherein at least one of
      (i) the first anti-cogging member and the second anti-cogging member are dedicated to providing the anti-cogging torque and do not provide a cogging torque,
      (ii) a frequency of the anti-cogging torque is a same frequency as a frequency of the cogging torque,
      (iii) a phase of the anti-cogging torque is a same phase as a phase of the cogging torque, or
      (iv) a magnitude of the anti-cogging torque is equal and opposite a magnitude of the cogging torque.

2. The apparatus of claim 1, wherein the second anti-cogging member is coupled to the rotatable shaft via a differential speed assembly.

3. The apparatus of claim 2, wherein the differential speed assembly includes two or more gears and is configured such that the second anti-cogging member rotates based on rotation of the rotatable shaft.

4. The apparatus of claim 1, wherein:
the rotatable shaft is operable to rotate about an axis of rotation; and
the at least one lobe extends radially with respect to the axis of rotation.

5. The apparatus of claim 1, wherein:
the rotatable shaft is operable to rotate about an axis of rotation; and
the at least one lobe extends axially with respect to the axis of rotation.

6. The apparatus of claim 1, wherein:
the at least one abutment member comprises a plurality of abutment members;
the cam surface comprises a plurality of lobes; and
a number and arrangement of the plurality of abutment members and a number and arrangement of the plurality of lobes are such that the anti-cogging torque acting on the rotatable shaft corresponds to and opposes cogging inputs acting on the rotatable shaft.

7. The apparatus of claim 1, wherein:
the second anti-cogging member is coupled to the rotatable shaft via a gearset; and
the at least one abutment member, the at least one lobe, and the gearset are configured such that the anti-cogging torque acting on the rotatable shaft corresponds to and opposes cogging inputs acting on the rotatable shaft.

8. The apparatus of claim 1, wherein:
the cam surface includes a plurality of lobes; and
the at least one abutment member is operable to sequentially abut against the plurality of lobes to sequentially provide anti-cogging torque to the rotatable shaft.

9. The apparatus of claim 1, wherein:
the at least one abutment member includes a plurality of abutment members; and
the plurality of abutment members are operable to sequentially abut against the at least one lobe to sequentially provide anti-cogging torque to the rotatable shaft.

10. The apparatus of claim 1, wherein:
the at least one lobe is fixed to the rotatable shaft; and
the at least one abutment member is operable to move relative to the cam surface.

11. The apparatus of claim 10, further comprising at least one biasing member that biases the at least one abutment member toward the cam surface,
wherein the biasing member is a potential energy storage device that includes a helical spring, a leaf spring, or a pneumatic cylinder.

12. The apparatus of claim 1, wherein the at least one abutment member is fixed to the rotatable shaft and is operable to move relative to the cam surface.

13. The apparatus of claim 12, further comprising at least one biasing member that biases the at least one abutment member toward the cam surface,
wherein the biasing member is a potential energy storage device that includes a helical spring, a leaf spring, or a pneumatic cylinder.

14. The apparatus of claim 1, wherein:
the rotatable shaft is a crankshaft of an internal combustion engine;
the cogging torque occurs due to varying pressure within an engine cylinder; and
the anti-cogging torque occurs due to varying biasing loads from the at least one biasing member.

15. The apparatus of claim 1, further comprising a control module that controls an amount of the anti-cogging torque provided to the rotatable shaft.

16. The apparatus of claim 15, further comprising an object having a mass and being connected to both the rotatable shaft and the at least one abutment member via a coupling device, wherein the coupling device is configured to adjust the amount of the anti-cogging torque based on centrifugal forces associated with rotation of the object.

17. The apparatus of claim 15, wherein the rotatable shaft is one of:
a crankshaft of an internal combustion engine, wherein the cogging torque occurs due to varying pressure within an engine cylinder; and
an input shaft of a camming system, wherein the cogging torque occurs due to varying biasing loads from the at least one biasing member.

18. An apparatus that improves rotation of a rotatable shaft, wherein the rotatable shaft has a cyclical cogging torque acting thereon in a first direction, the apparatus comprising:
a support member that is adjacent the rotatable shaft, the rotatable shaft operable to rotate relative to the support member;
a first anti-cogging member coupled to the support member;
a second anti-cogging member that is coupled directly or indirectly to the rotatable shaft to rotate based on rotation of the shaft;
a cam surface having at least one lobe that is included on one of the first and second anti-cogging members;
at least one abutment member that is coupled to the other of the first and second anti-cogging members, wherein the at least one abutment member is operable to abut against the cam surface to provide an anti-cogging torque to the rotatable shaft in a second direction that opposes the first direction to at least partially offset the cogging torque;
at least one biasing member that biases the at least one abutment member toward the cam surface;
a control module that controls an amount of the anti-cogging torque provided to the rotatable shaft; and
an actuator,
wherein the control module is configured to control the actuator to adjust tension or compression forces on the at least one biasing member.

19. The apparatus of claim 18, wherein the at least one biasing member is a variable rate spring.

20. The apparatus of claim 18, wherein:
the at least one abutment member is configured to be aligned along a straight line extending (i) radially from an axis of rotation of the rotatable shaft, or (ii) in an axial direction and parallel to the axis of rotation of the rotatable shaft; and
the actuator is configured to, along the straight line, (i) actuate the at least one abutment member relative to the support member, or (ii) actuate the support member relative to the at least one abutment member.

21. A method of improving rotation of a rotatable shaft about an axis, the rotatable shaft having a cyclical cogging torque acting thereon in a first direction, the method comprising:
rotating the shaft to cause relative rotation between at least one abutment member and a camming member, wherein the camming member is configured to interact with the at least one abutment member to provide an anti-cogging torque to the rotatable shaft in a second direction that opposes the first direction to at least partially offset the cogging torque; and
selectively varying an amount of the anti-cogging torque provided to the rotatable shaft,
wherein at least one of (i) the camming member is dedicated to providing the anti-cogging torque and does not provide a cogging torque, (ii) a frequency of the anti-cogging torque is a same frequency as a frequency of the cogging torque, (iii) a phase of the anti-cogging torque is a same phase as a phase of the cogging torque, or (iv) a magnitude of the anti-cogging torque is equal and opposite a magnitude of the cogging torque.

22. The method of claim 21, wherein varying the amount of anti-cogging torque includes varying a preload on a biasing member.

23. The method of claim 22, wherein the biasing member is a variable rate spring.

24. The method of claim 22, wherein:

the biasing member is an air cylinder; and the varying of the amount of anti-cogging torque includes varying a pressure in the cylinder.

25. A method of improving rotation of a rotatable shaft about an axis, the rotatable shaft having a cyclical cogging torque acting thereon in a first direction, the method comprising:

rotating the shaft to cause relative rotation between at least one abutment member and a camming member, wherein the camming member is configured to interact with the at least one abutment member to provide an anti-cogging torque to the rotatable shaft in a second direction that opposes the first direction to at least partially offset the cogging torque;

selectively varying an amount of the anti-cogging torque provided to the rotatable shaft;

biasing the at least one abutment member toward the cam surface via at least one biasing member; and controlling an actuator to adjust tension or compression forces on the at least one biasing member to adjust the amount of the anti-cogging torque provided to the rotatable shaft.

* * * * *